United States Patent [19]

Cochran

[11] 4,107,782
[45] Aug. 15, 1978

[54] PROMPTING PROGRAMMABLE CALCULATOR

[75] Inventor: Michael J. Cochran, Richardson, Tex.

[73] Assignee: Texas Instruments Incorporated, Dallas, Tex.

[21] Appl. No.: 810,660

[22] Filed: Jun. 27, 1977

Related U.S. Application Data

[63] Continuation of Ser. No. 622,280, Oct. 10, 1975, abandoned.

[51] Int. Cl.² .......................................... G06F 15/06
[52] U.S. Cl. ................................... 364/706; 364/200
[58] Field of Search .............. 364/706, 709, 200, 900

[56] References Cited

U.S. PATENT DOCUMENTS

| | | | |
|---|---|---|---|
| 3,533,076 | 10/1970 | Perkins et al. | 364/200 |
| 3,533,078 | 10/1970 | Perkins et al. | 364/200 |
| 3,760,171 | 4/1973 | Wang et al. | 364/706 |
| 3,760,375 | 9/1973 | Irwin et al. | 364/200 |
| 3,976,975 | 8/1976 | Cochran | 364/709 X |
| 3,979,057 | 9/1976 | Katz et al. | 364/706 |
| 3,979,058 | 9/1976 | Katz et al. | 364/706 |
| 4,012,725 | 3/1977 | Spangler et al. | 364/706 |

OTHER PUBLICATIONS

"Tektronix Programmable Calculators" Information Display Division, Tektronix, Inc. Beaverton, Oregon brochure.

*Primary Examiner*—David H. Malzahn
*Attorney, Agent, or Firm*—Rene' E. Grossman; Richard P. Berg

[57] ABSTRACT

A user programmable calculator includes a keyboard, output display means and logic circuitry which generates to the output display means a prompting message indication of the type of data or function entry which the system's operative program, which may be a user stored program, next expects. The keyboard includes a special set of response keys in addition to the numerical and function keys normally incorporated on calculator systems. The special keys facilitate responding to data functional information requests by the calculator. The calculator may be programmed by the user to perform a series of functions upon data entries by entering a series of program steps from the keyboard or from a storage media such as magnetic card, paper tape or the like. The program steps which contain the prompting messages are stored in registers of the calculator system. Upon execution of the stored user program, each time data, functional or responsive information is required a coded representation of the particular entry required to proceed is generated by the logic circuitry and displayed to the user by the display means. The required data may then be entered from the keyboard and the program will continue until entry of further data is required from the user, thereby allowing the user to input in proper sequence a long series of inputs to execute a previously programmed operation on a desired set of data without referring to the program itself.

11 Claims, 42 Drawing Figures

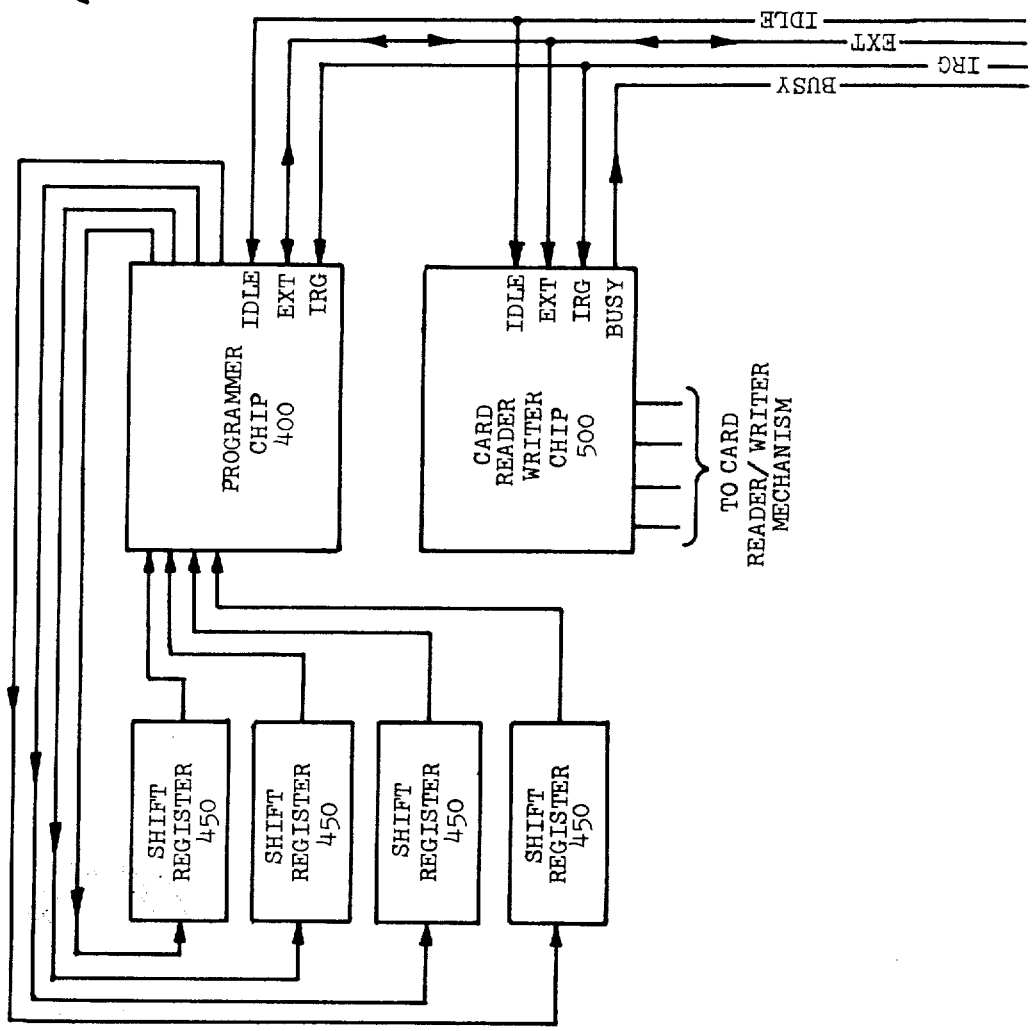

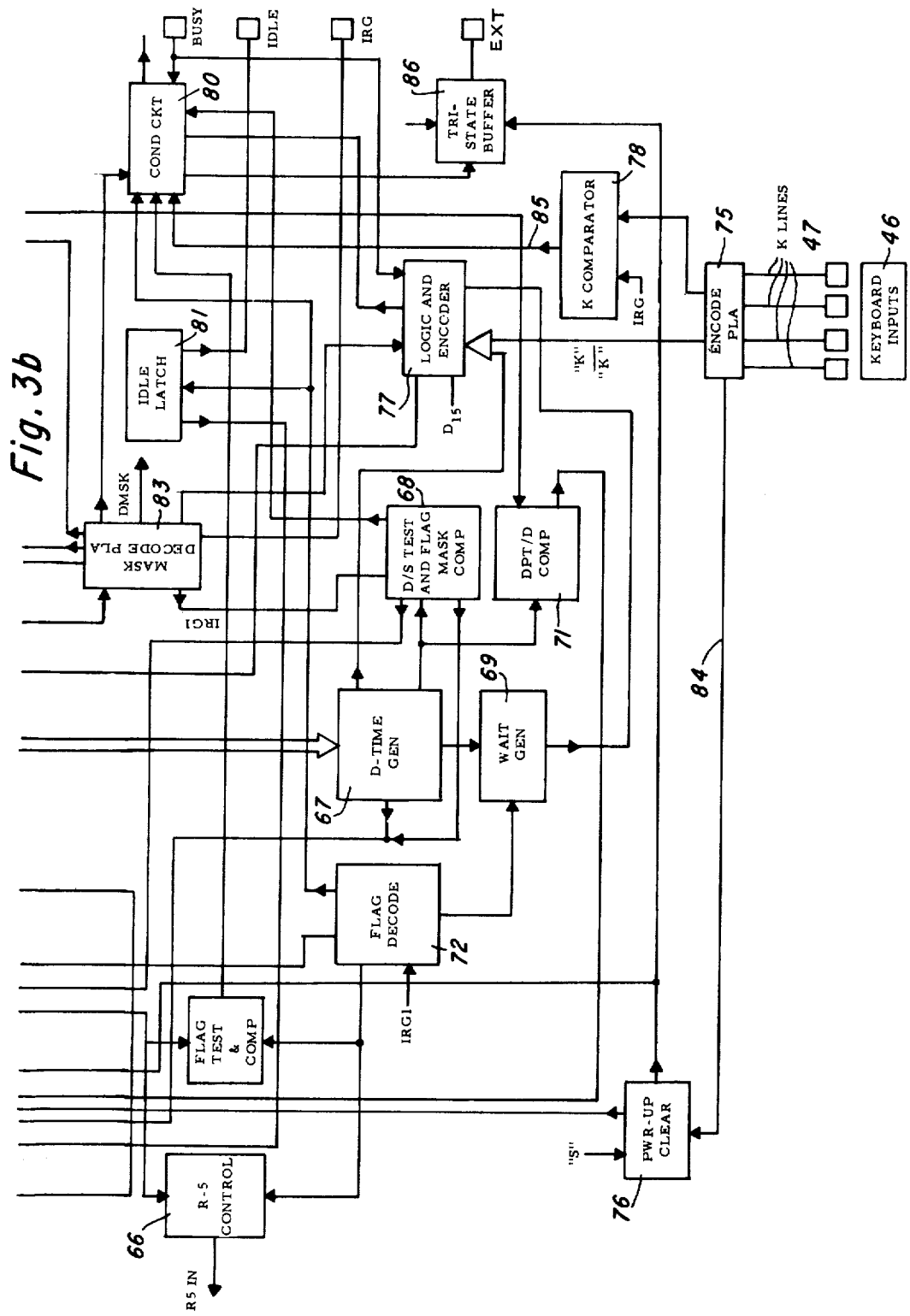

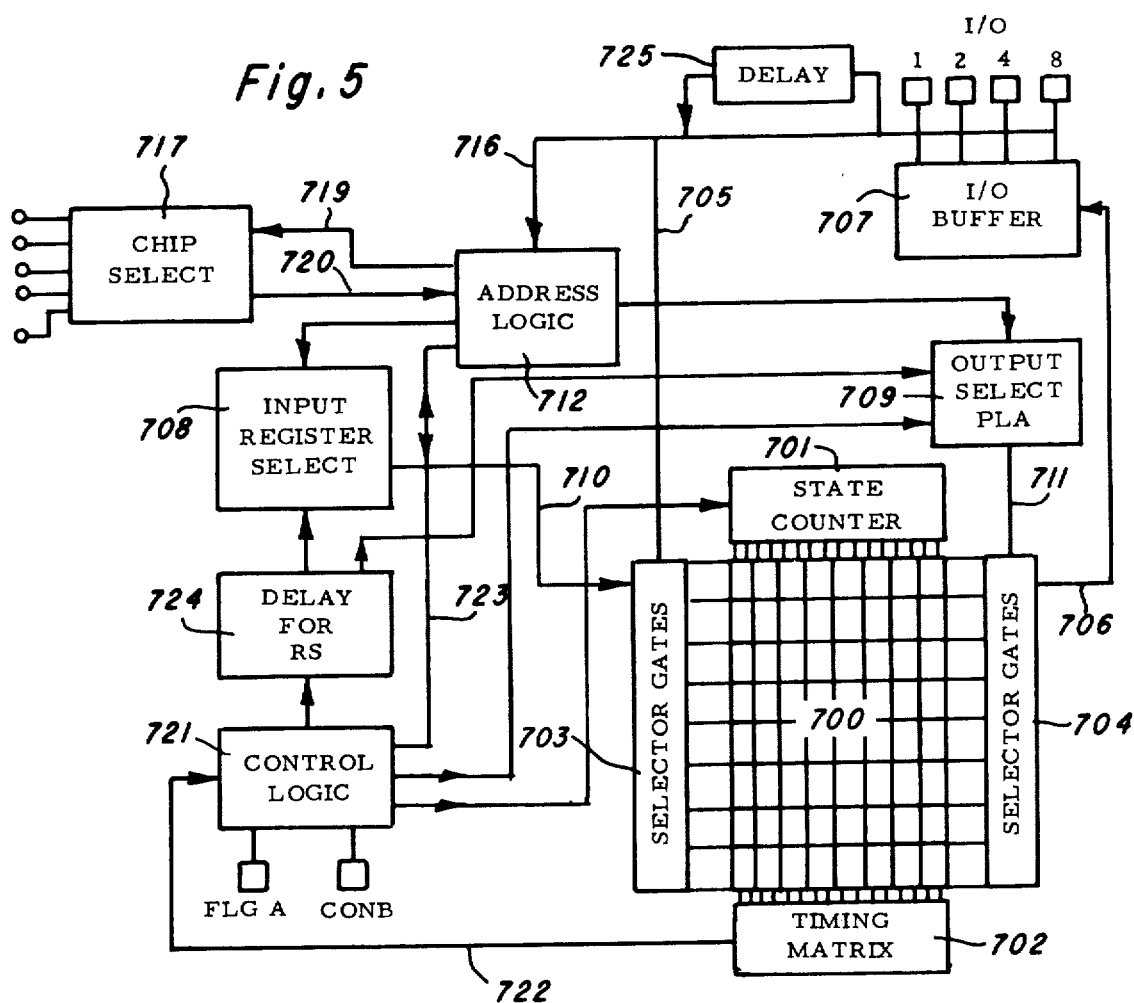
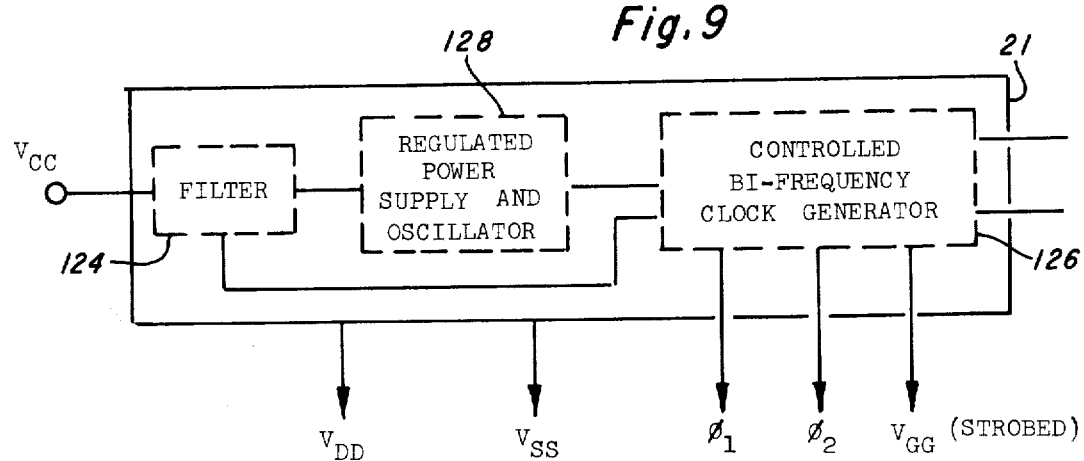

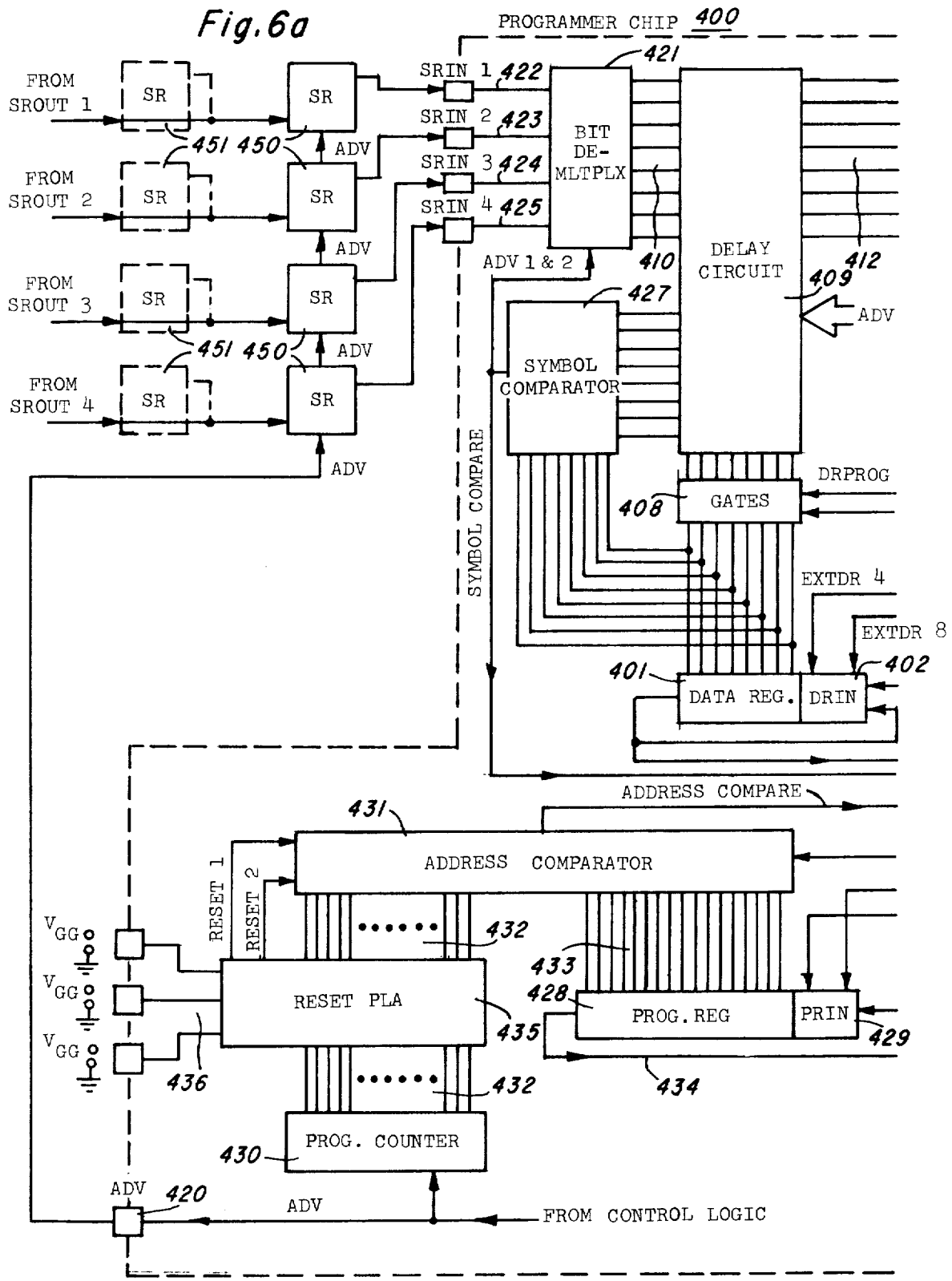

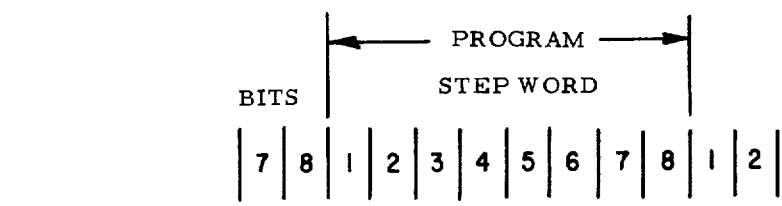
FIG. 8a
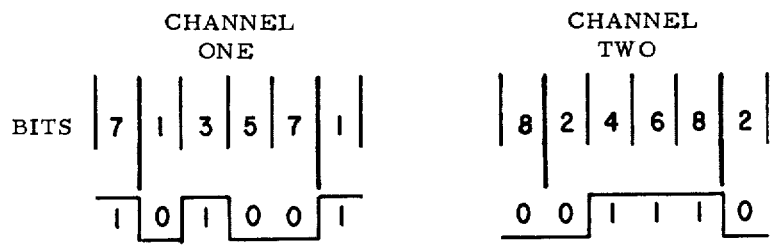
FIG. 8b
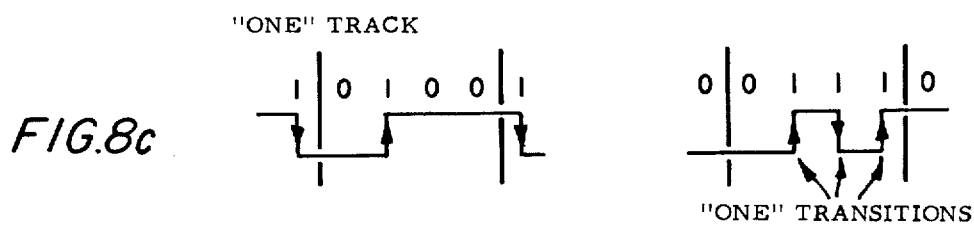
FIG. 8c
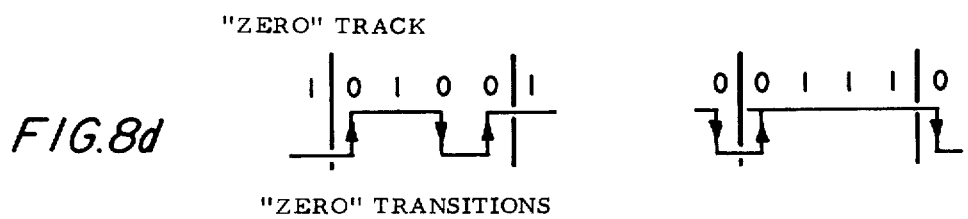
FIG. 8d

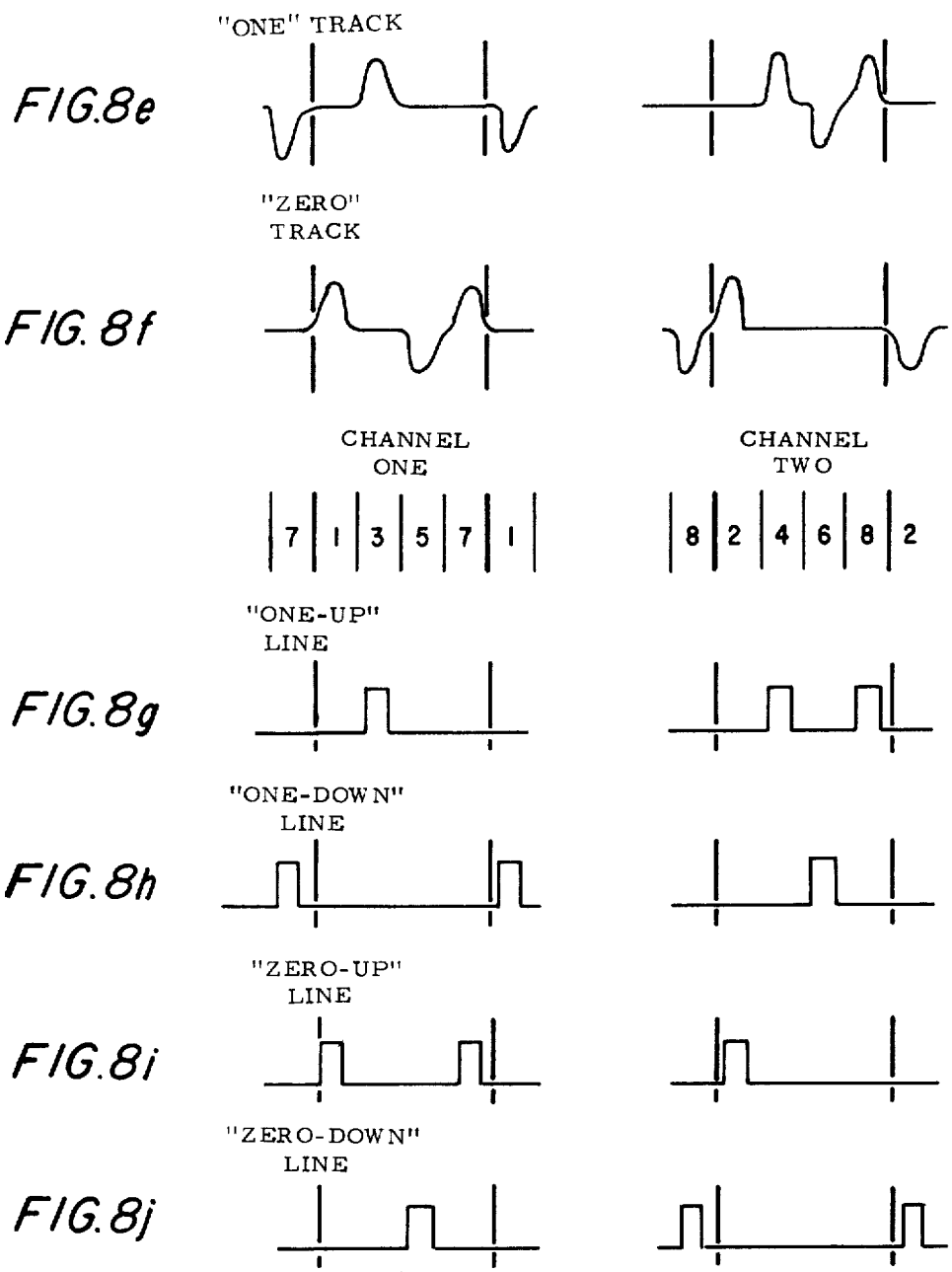

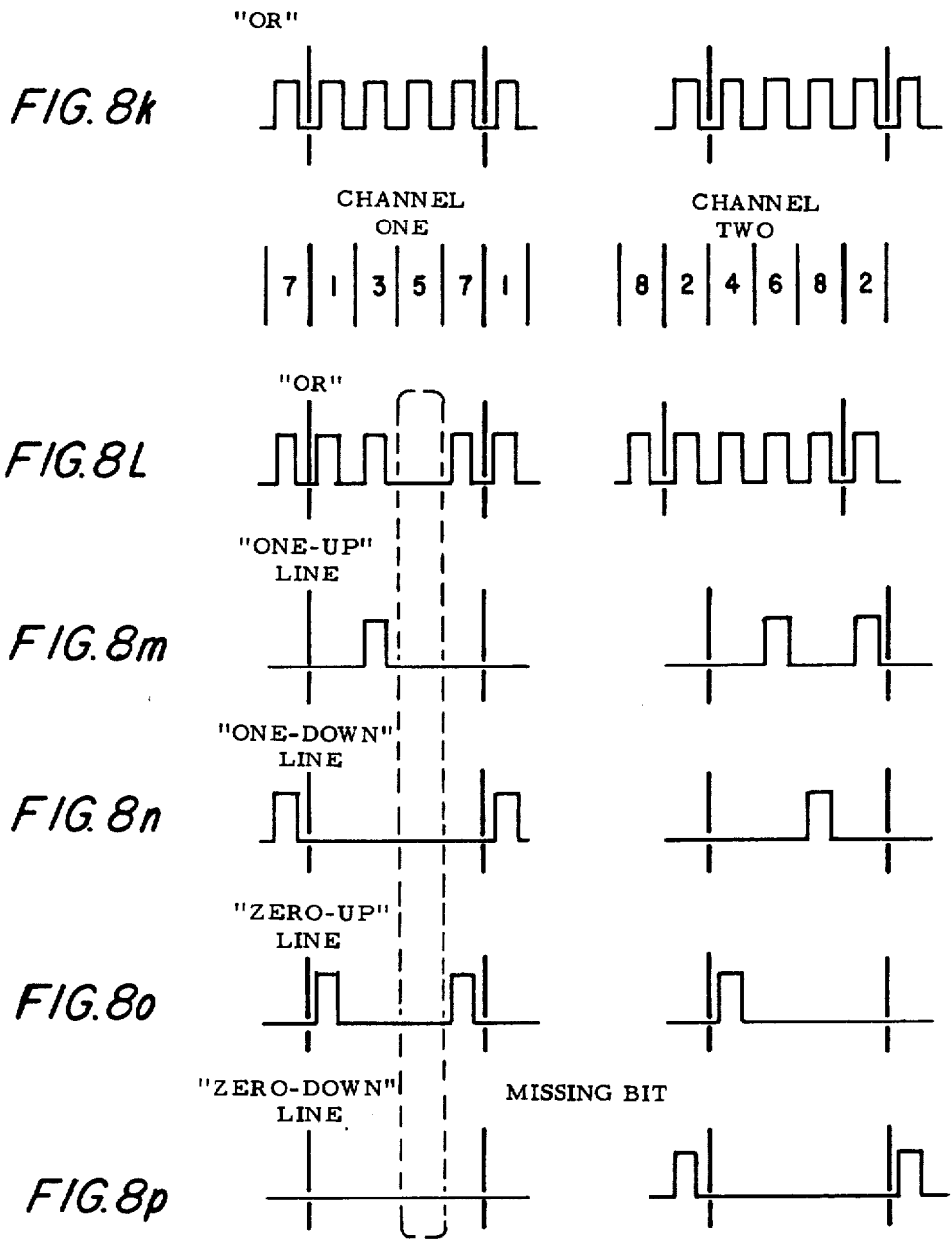

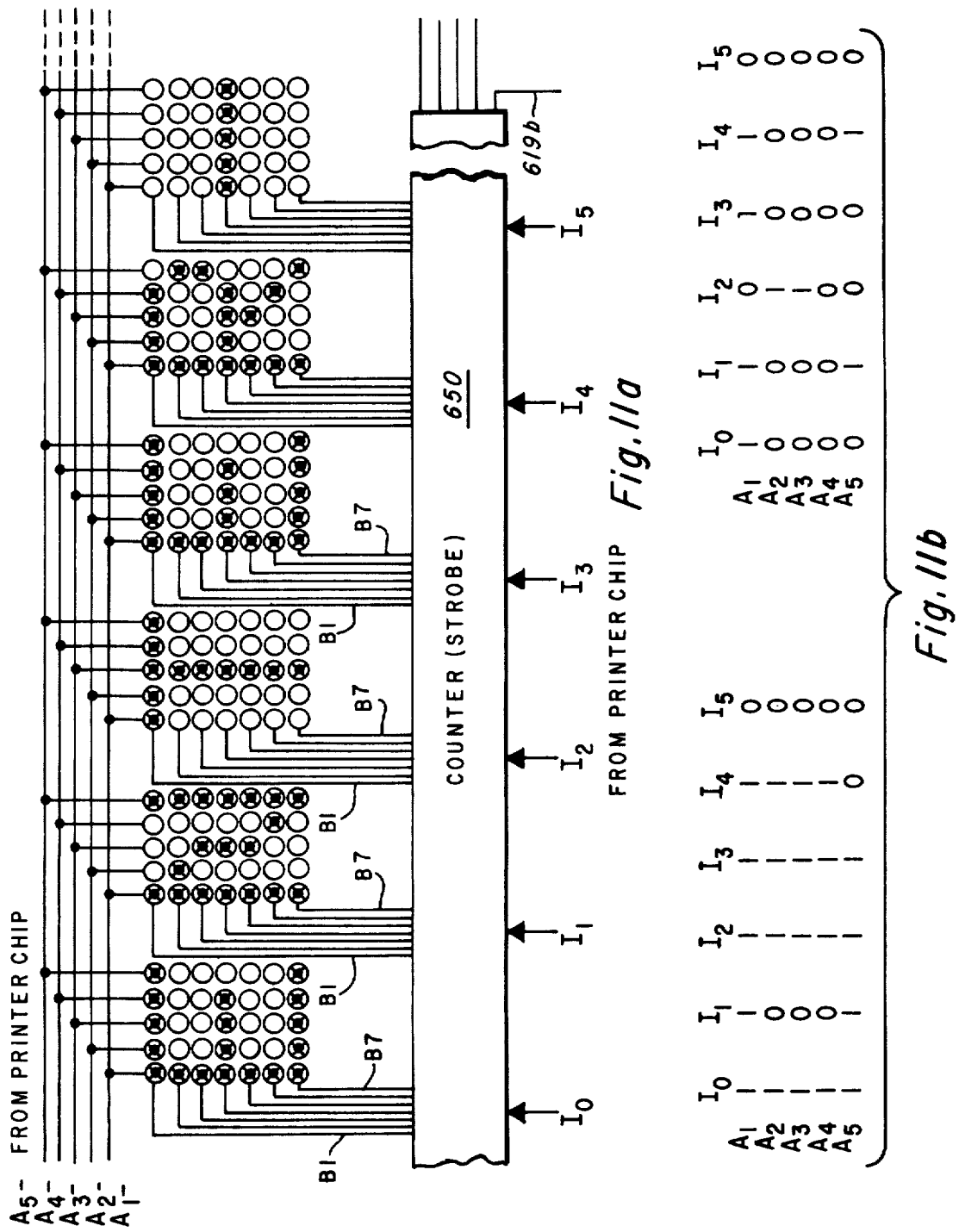

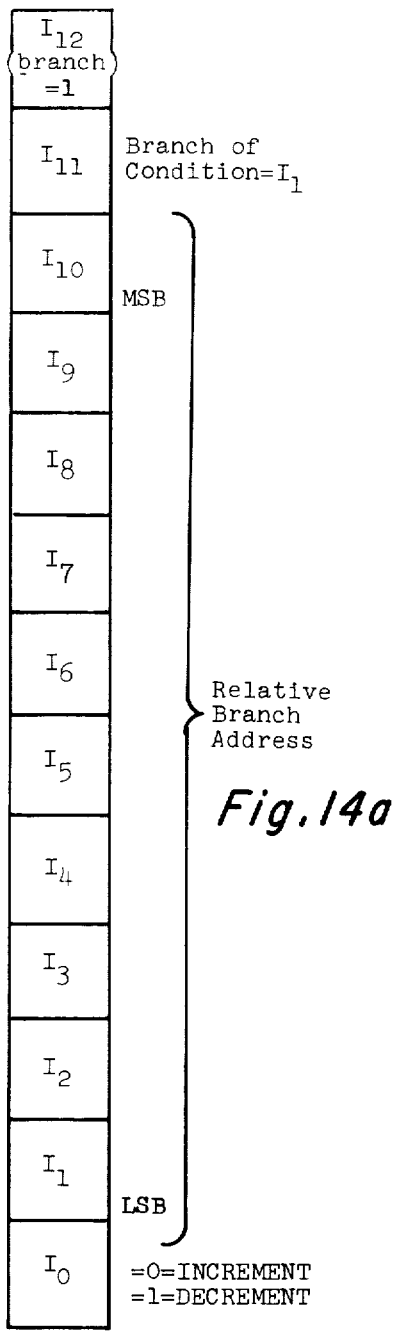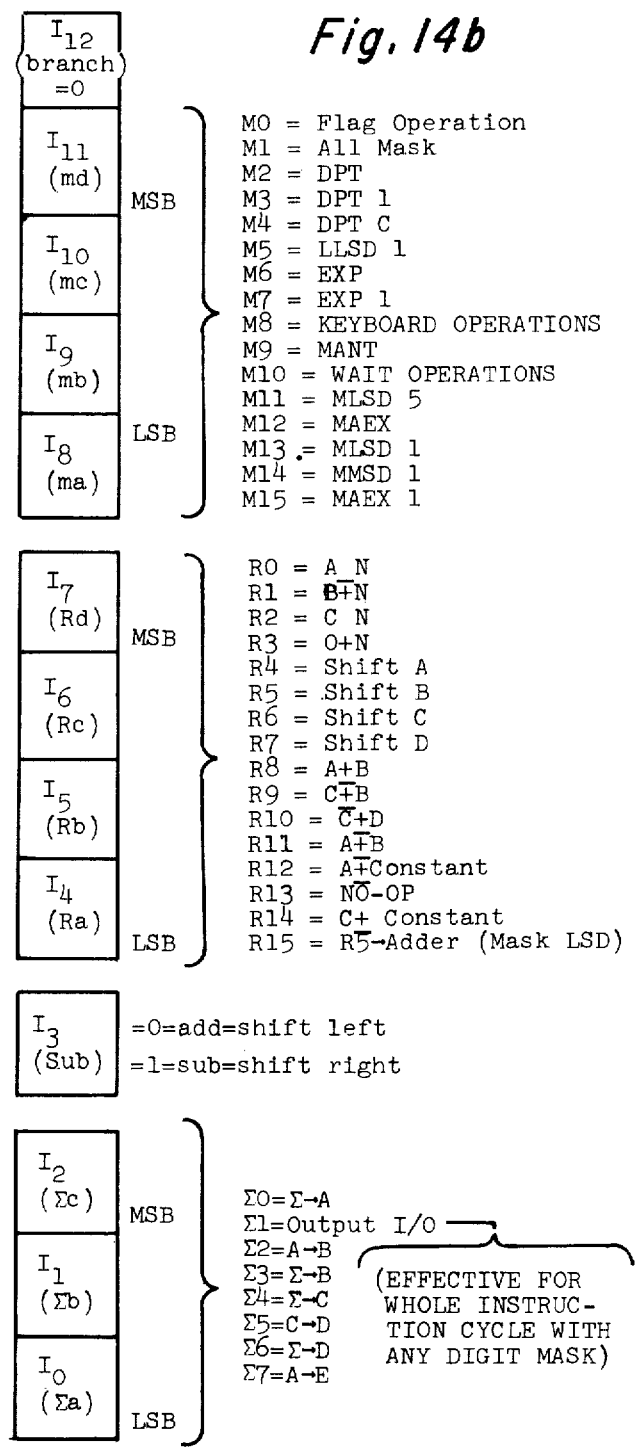
Fig. 14a
Fig. 14b

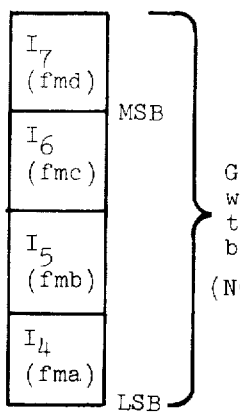

The following 8 bits effective only if flag operations

Generate FlagMask when these 4 bits equal the 4 encoded state bits.
(NOTE: ENCODED STATE TIMES ARE +2 FROM ACTUAL STATES)

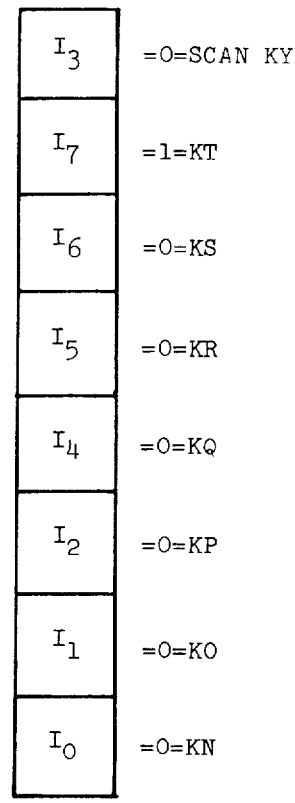

The following 8 bits effective only if Keyboard operations $I_3$ = 0 = SCAN KYBD
$I_7$ = 1 = KT
$I_6$ = 0 = KS
$I_5$ = 0 = KR
$I_4$ = 0 = KQ
$I_2$ = 0 = KP
$I_1$ = 0 = KO
$I_0$ = 0 = KN

*Fig. 14d*

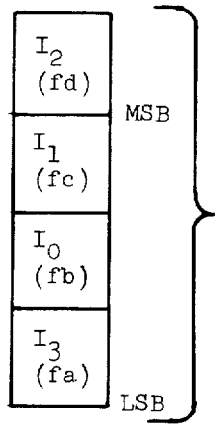

The following 4 bits (flagops) effective only during flagmask except $f_{14}$ & $f_{15}$ $f_0$ = TEST FLAG A
$f_1$ = TEST FLAG B
$f_2$ = SET FLAG A
$f_3$ = SET FLAG B
$f_4$ = ZERO FLAG A
$f_5$ = ZERO FLAG B
$f_6$ = INVERT FLAG A
$f_7$ = INVERT FLAG B
$f_8$ = EXCH. FLAG A B
$f_9$ = COMPARE FLAG A B
$f_{10}$ = SET FLAG KR
$f_{11}$ = ZERO FLAG KR
$f_{12}$ = COPY FLAG B→A
$f_{13}$ = COPY FLAG A→B
$f_{14}$ = REG 5→FLAG A S0 S3
$f_{15}$ = REG 5→FLAG B S0 S3

*Fig. 14c*

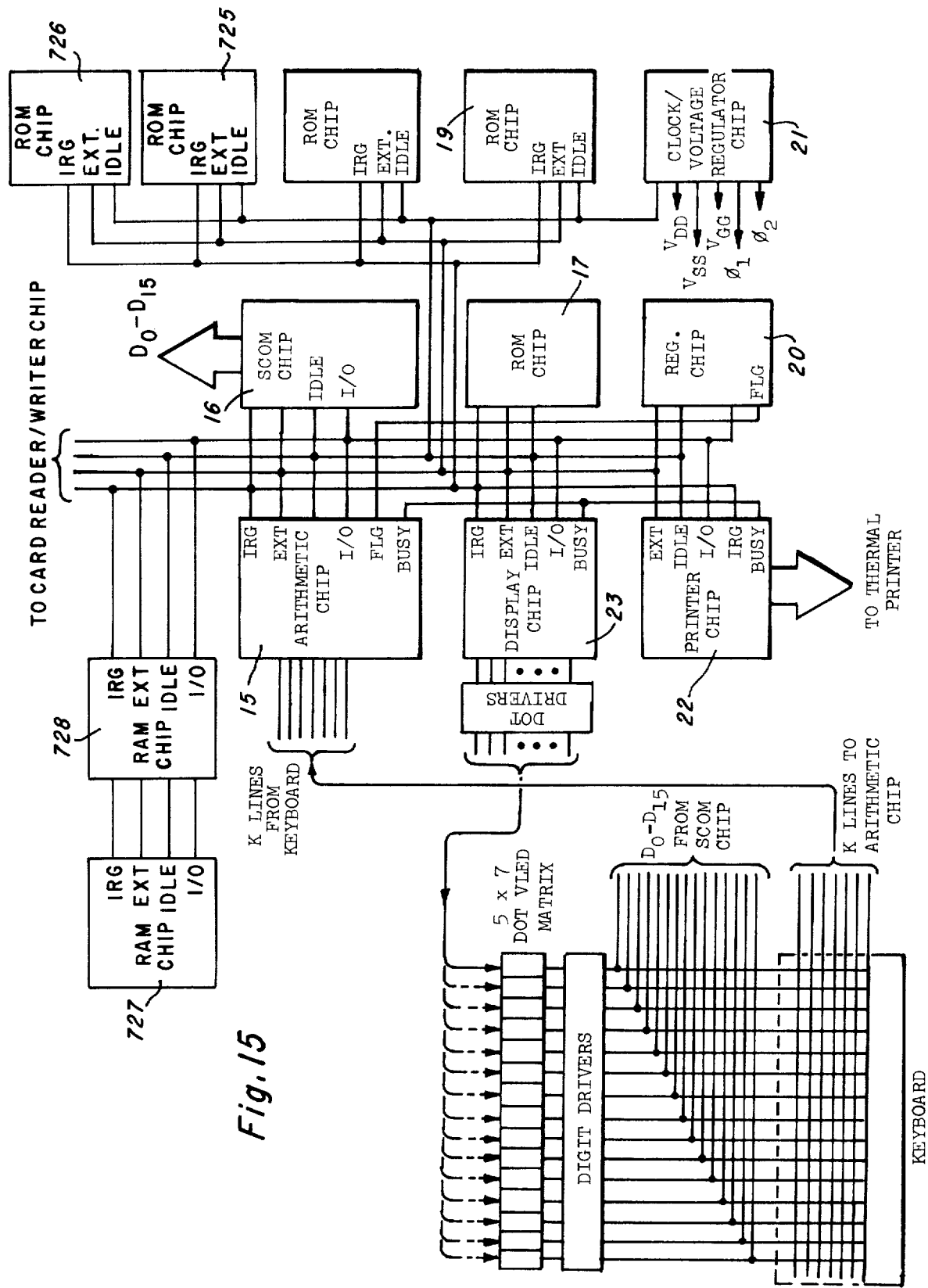

PROMPTING PROGRAMMABLE CALCULATOR

This is a continuation of application Ser. No. 622,280, filed Oct. 10, 1975 now abandoned.

This invention relates to programmable calculator systems and, more particularly, to programmable calculators of a type which visually prompt the user as to the next keyboard input expected by the calculator system.

BACKGROUND OF THE INVENTION

Calculators have rapidly evolved relatively simple systems providing the basic four functions of addition, subtraction, multiplication and division into complex systems capable of providing trigonometric, logarithmic, exponential, and diverse other functions. Early calculator systems were implemented using a multiplicity of discrete integrated circuit packages. Later versions were more generally implemented in large scale integrated circuits until systems, such as disclosed in copending patent application, "Variable Function Calculator," Ser. No. 163,565, filed July 19, 1971, now abandoned and replaced by continuation application Ser. No. 420,999 filed Dec. 3, 1973, now abandoned, were implemented having all of the electronics on a single LSI chip. Thereafter, complexity increased and a plurality of LSI chips were utilized in systems, such as set forth in "Expandable Function Electronic Calculator," Ser. No. 444,226, filed Feb. 20, 1974, and its continuation-in-part, Ser. No. 607,525, filed May 16, 1973, now U.S. Pat. No. 3,984,816. Even more sophisticated systems were developed employing a plurality of large scale integrated circuit chips which efficiently allowed expanded data memory and program memory storage which allowed even the most sophisticated functions to be provided in a handheld calculator, such as described in detail in U.S. Pat. No. 3,900,722, and assigned to the assignee of this application.

Because of this evolution into sophisticated and complex machines, the operating instructions for these calculators have generally also become correspondingly sophisticated and complex. That is, the user of such a complex calculator generally must either frequently refer to an operating instructions guide which recites the particular sequence of inputs required by the systems, or the user must recall from his own memory the particular list before the calculator can be utilized to its fullest. The typical user would prefer not to have to carry along and refer to a user manual in order to effectively utilize the calculator.

Creating further difficulty for a user; beyond the complexity of its internal input sequence, a calculator may be of the type which allows the user thereof to store a desired program in the calculator in order to perform a particular series of functions. Such a user program may be entered from the calculator keyboard or may be read directly from a storage media such as magnetic cards or paper tapes. Once entered, the user program may be executed to provide instructions to the calculator system. In this manner, various stored functions are performed on data as it is being provided to the calculator through the keyboard. This data must be entered at the appropriate point in the operation of the program and in the proper sequence. For sophisticated programs prepared by the calculator manufacturer, a user's manual may be provided which indicates the proper sequence of data input, but this approach has all the disadvantages described above (because of the necessity of memorizing or constantly using such a manual). For programs written by the user himself, no such manual is available unless produced by the user. This tends to limit the effectiveness of user designed programs. Without proper inputs in a proper sequence, a calcualtor program is useless. While a calculator system has been described in detail in copending patent application, "Prompting Calculator," Ser. No. 439,473, filed Feb. 4, 1974, now U.S. Pat. No. 3,976,975 which provides prompting messages to the user in order to indicate what keyboard entry is next expected by the calculator's internally implemented functions, some such means indicating the next expected entry in a user-inserted program is needed.

It is therefore an object of the present invention to provide an improved user programmable electronic calculator system.

Another object of the invention is to provide an improved electronic calculator system which generates prompting messages indicative of information or data required by such calculator system in order to proceed with execution of a selected sequence of operations.

A still further object of the invention is to provide a user programmable calculator which generates prompting messages to the user.

Briefly, these and other objects and advantages are accomplished in accordance with the present invention, in which a user programmable calculator of the handheld or desk-top variety is proviede with a prompting feature which allows the calculator to indicate to the user thereof the next keyboard input or sequence of inputs expected by the calculator for the particular program being executed. The calculator includes a keyboard, output display means and logic circuitry which generates to the output display means a prompting message indicating the type of numerical data, function or other responsive information which the program next requires for further execution. The keyboard includes a special set of response keys in addition to the numerical and functional keys normally incorporated on programmable calculator systems. The special keys facilitate responding to data and functional information requests by the calculator. The calculator may be programmed by the user to perform a series of functions upon data entries by entering a series or program steps from the keyboard or from a storage media such as a magnetic card, paper tape or the like. The program steps as well as the desired prompting messages are stored in binary form in registers of the calculator system provided therefor. Upon execution of the stored user program, each time numerical functional or responsive information is required a coded representation of the particular entry required for the calculator to proceed is generated by the logic circuitry and a visual indication thereof displayed to the user by the display means. The required data may then be entered from the keyboard and the program will continue executing until entry of further information is required from the user, thereby allowing the user to input in proper sequence a long series of inputs in order to execute a previously stored program on a desired set of data without referring to a manual or to the program itself.

In one embodiment, a multi-semiconductor chip calculator system which is comprised of one or more semiconductor chips providing conventional calculator functions is implemented so as to interface with additional chips providing increased data word and instruction word storage plus alphanumeric output capability. The increased instruction word storage allows a more sophisticated operating program to be utilized for implementing the prompting sequence. In a further embodiment, the basic chips are also capable of interfacing with further additional chips which provide storage and recall of sequences of user program instructions. In this further embodiment, a sequence of user program instructions may be entered from the calculator keyboard, or by utilizing an external semiconductor chip which allows reading and/or writing of a storage media such as a magnetic card or the like. The user program storage is extensive and allows alphanumeric prompting instructions to be included within the program. In an alternate embodiment, the storage and recall of sequences of user program instructions including the prompting messages is handled by the conventional calculator functions with the user program stored in the central memory of the system along with the data and other system parameters.

Still further objects and advantages of the invention will become apparent upon reading the following detailed description of an illustrative embodiment in conjunction with the drawings wherein:

FIG. 1 is a top view of a calculator embodying the present invention showing in particular the keyboard input means and printing and display output means;

FIGS. 2a and 2b comprise a block diagram of a calculator system embodied in the present invention;

FIGS. 3a and 3b comprise a more detailed block diagram of the arithmetic chip of FIG. 2b;

FIG. 5 is a more detailed block diagram of the external data memory register chip of FIG. 2b;

FIGS. 6a and 6b are more detailed block diagrams of the programmer chip of FIG. 2a;

Figure 1:
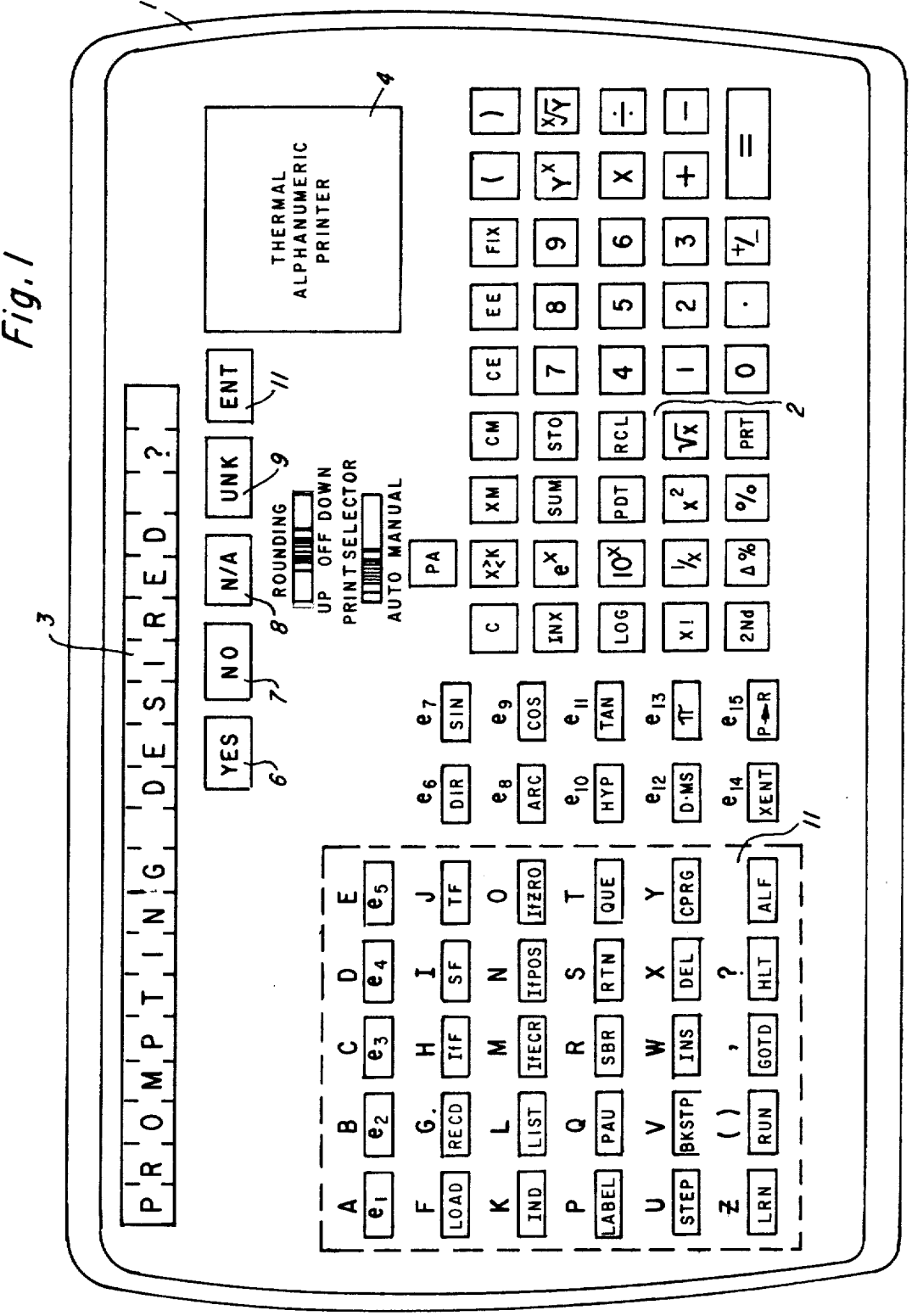
Figure 2B:
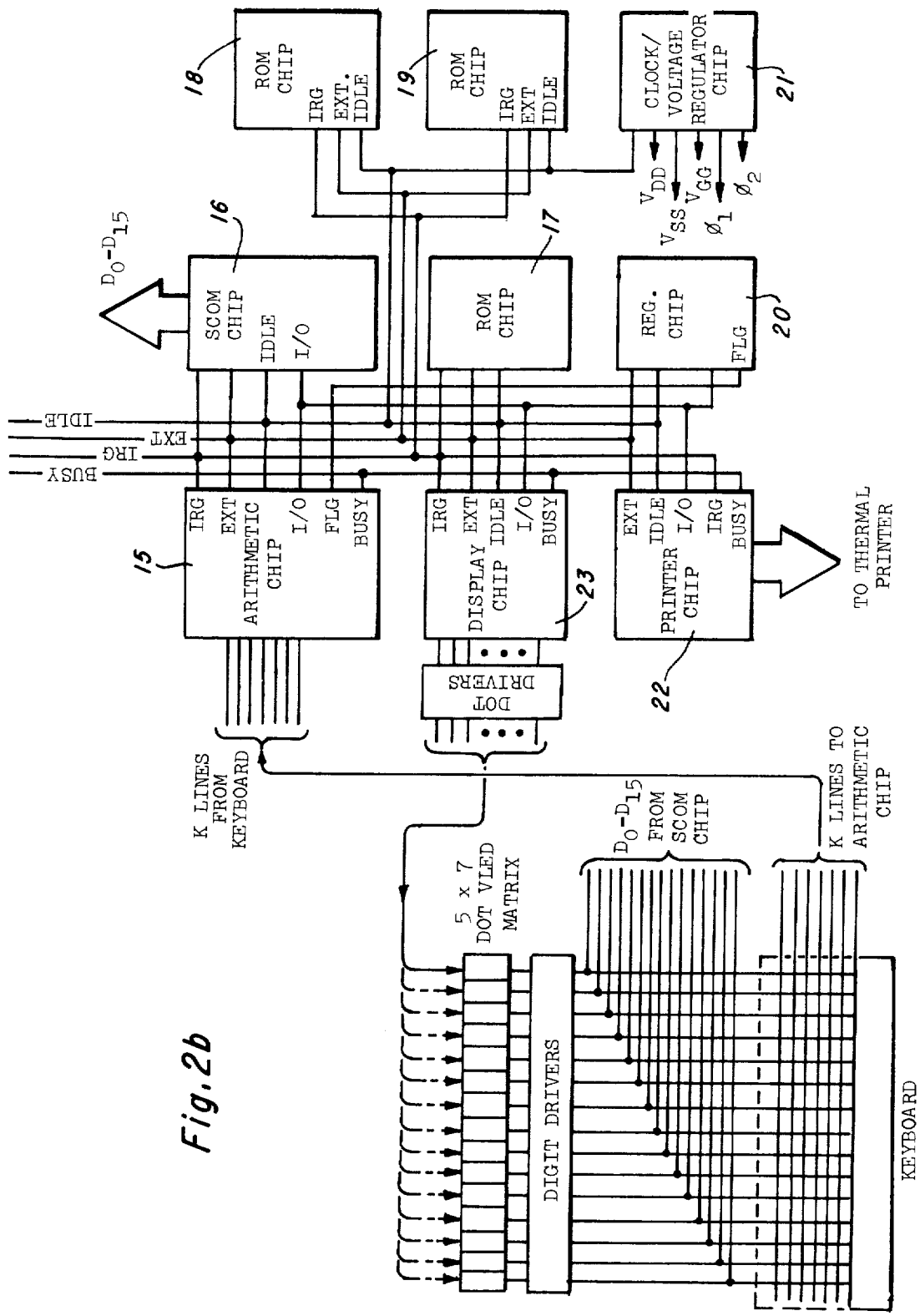
Figure 7A:
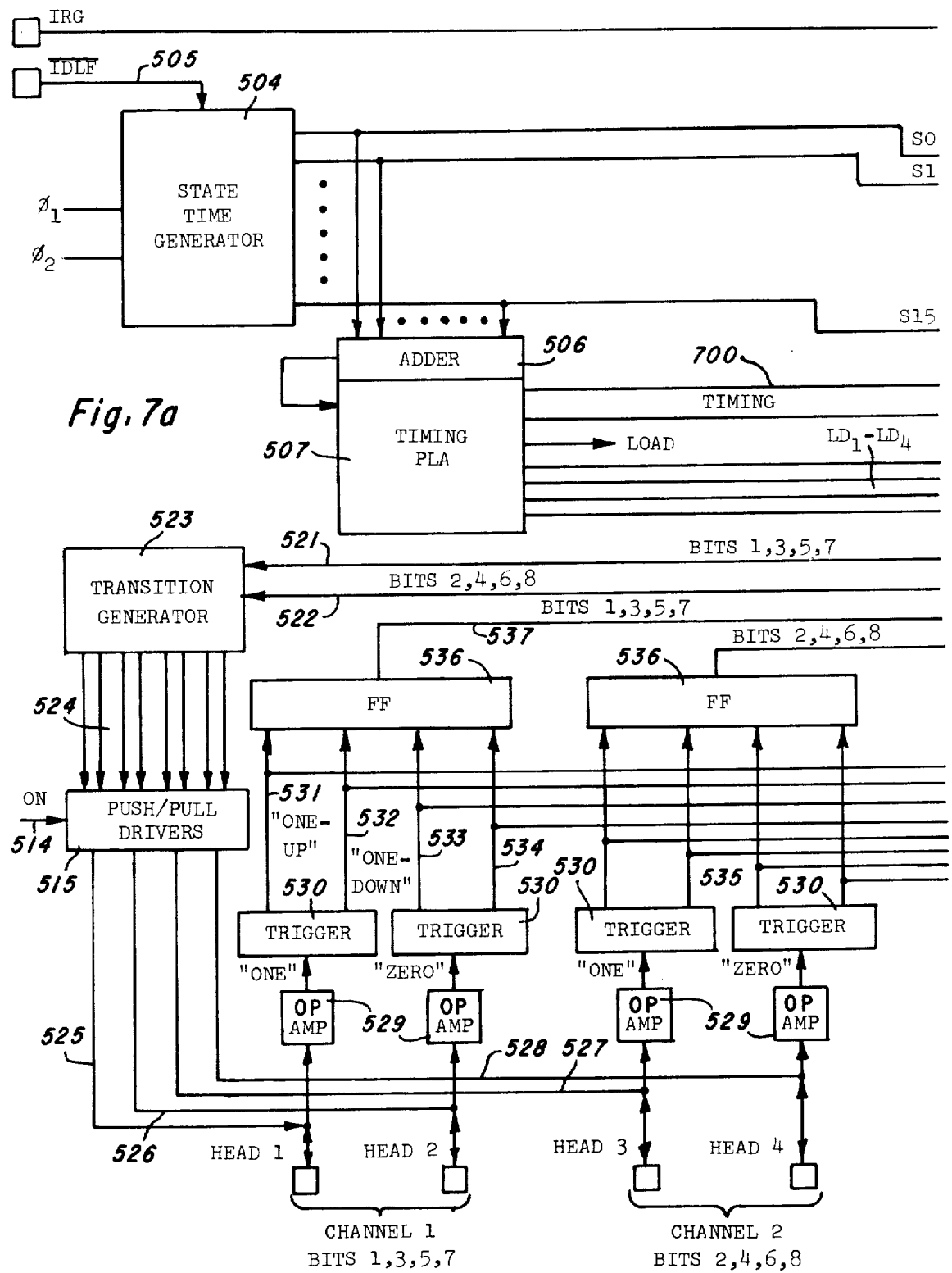
Figure 7B:
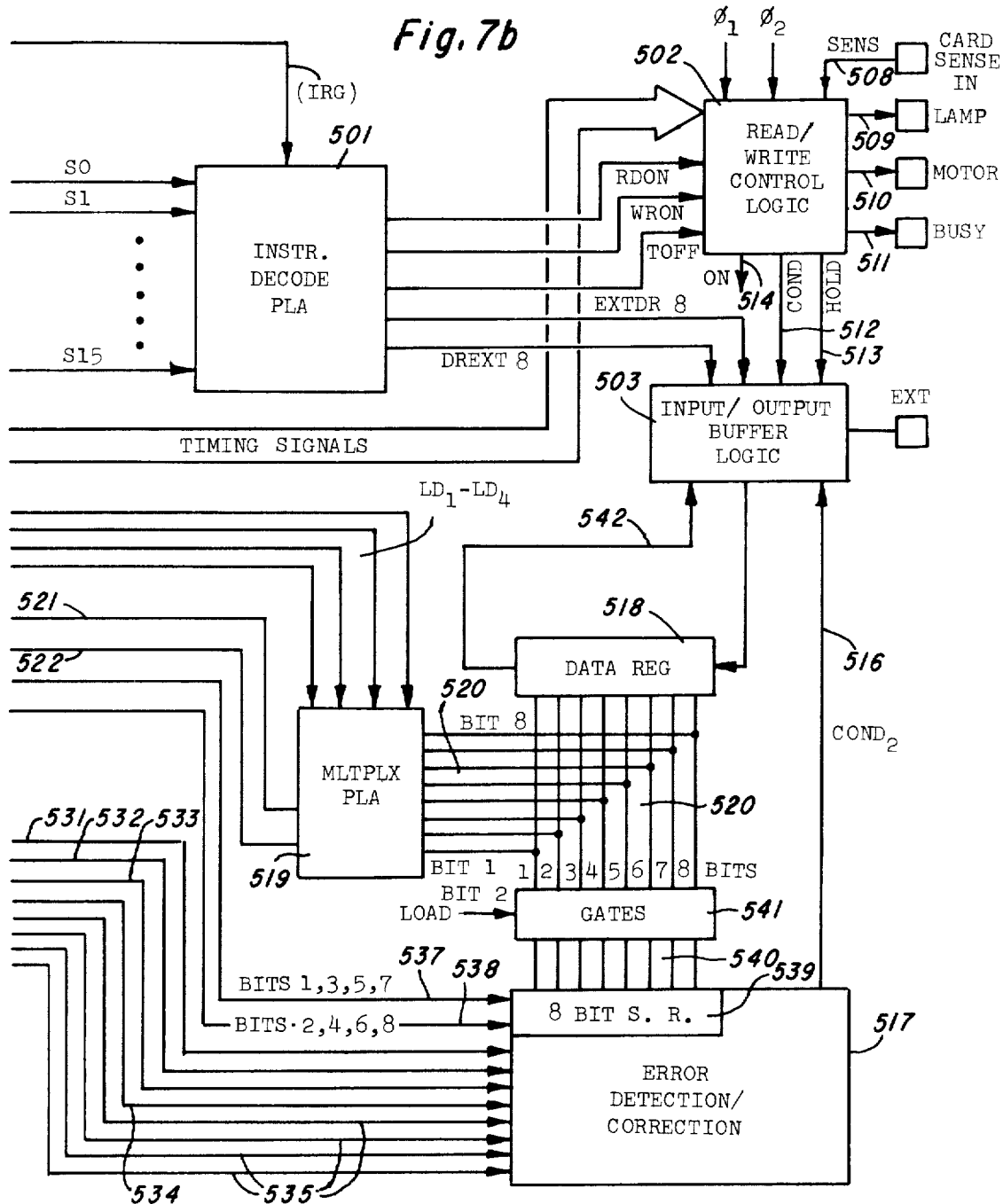
Figure 10:
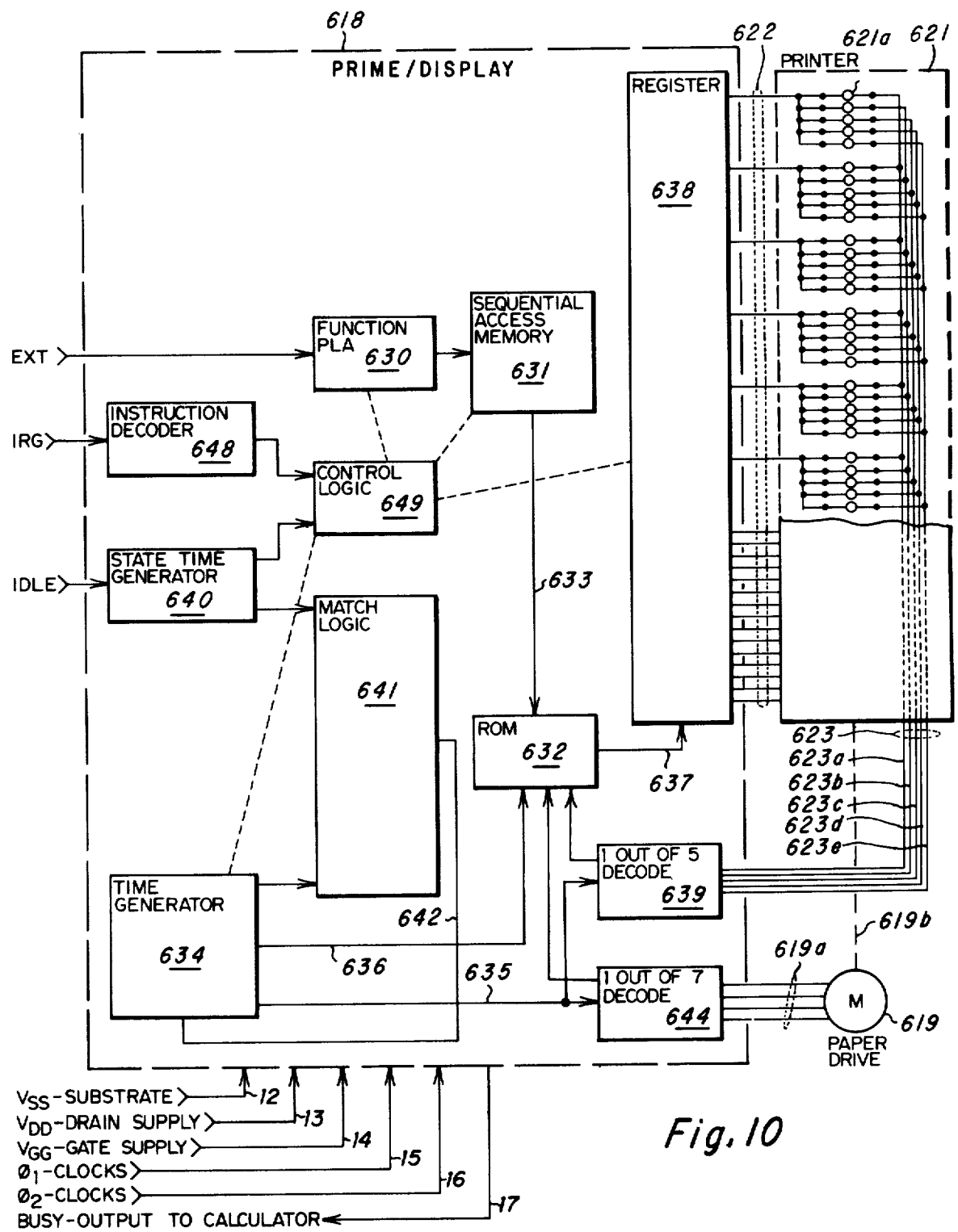
Figure 12A:
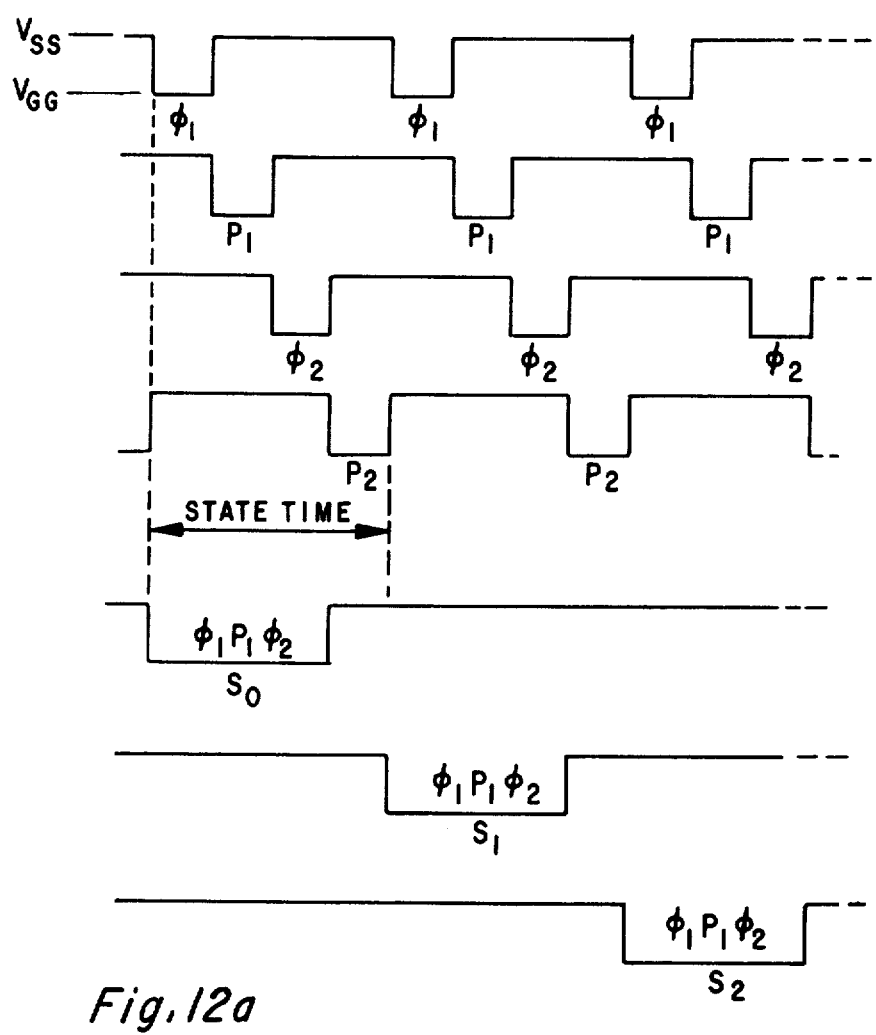
Figure 12B:
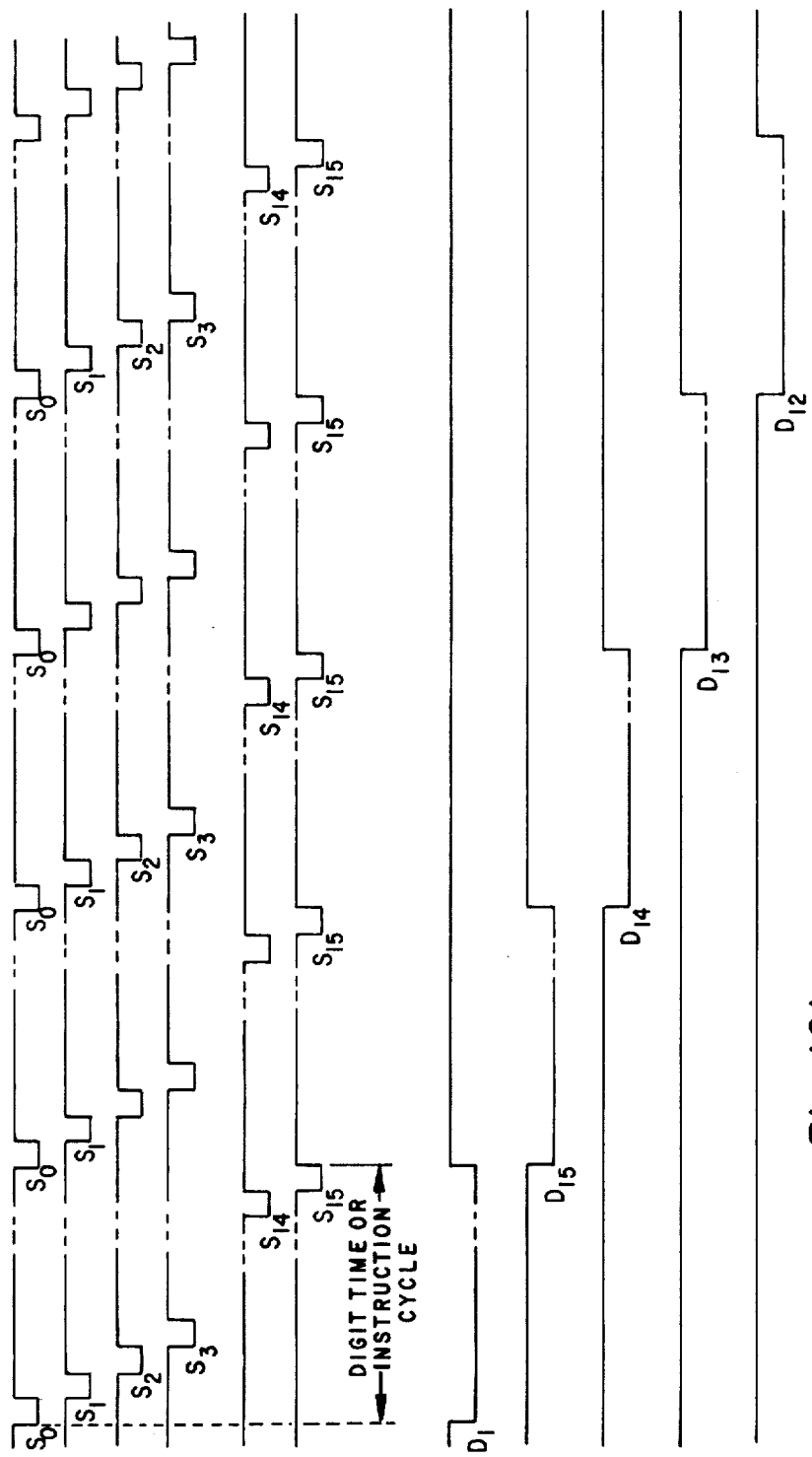
Figure 13:
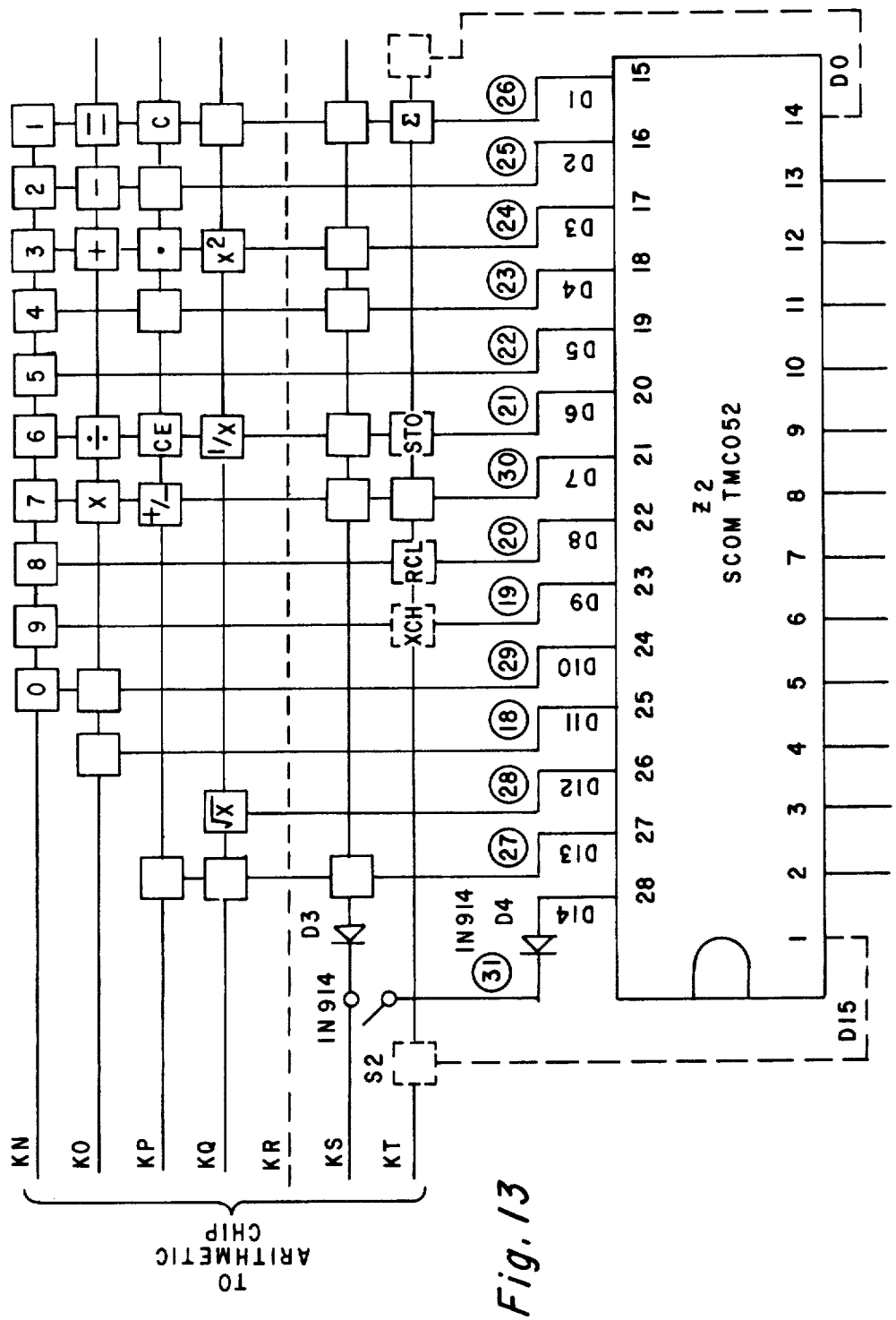

FIGS. 7a and 7b comprise a more detailed block diagram of the card reader/writer chip of FIG. 2a;

FIGS. 8(a) –8(p) illustrate an example of reading and writing information;

FIG. 9 is a block diagram of the clock/voltage regulator chip utilized in the embodiment of FIGS 2a and 2b;

FIG. 10 is a block diagram of the printer chip of FIG. 2b;

FIG. 11a is a circuit diagram of a thermal printer assembly utilized in accordance with an embodiment of FIGS. 1, 2a and 2b;

FIG. 11b is a table showing an example of binary data supplied by the printer chip of FIG. 10 to provide the display shown in FIG. 11b;

FIGS. 12a and 12b are timing diagrams of the calculator system of FIGS. 2a and 2b;

FIG. 13 is a circuit diagram of the keyboard showing the connections of the keyboard matrix to the arithmetic and SCOM chips;

FIGS. 14a–14g are tables showing representations of data transfer in the calculator system embodied in FIGS. 2a and 2b.

FIG. 15 is a block diagram of an alternate embodiment of a calculator system embodying the present invention.

Referring now to FIG. 1, there is shown a calculator, embodied in the present invention, having a keyboard 1, a display 3 and a printer 4.

A set of function and numeric data keys 2 provide inputs into such conventional functions as add, subtract, multiply, divide, reciprocal, square and square root. Furthermore, the conventional store, recall, summation and clear memories functions are provided, as well as percent and add on discount keys. Other keys which are provided for the printing function of the calculator include a "print" key (PRT) for requesting actuation of the printer, a "paper advance" key (PA) and an auto/-manual print selector switch. A rounding off/up/down mode select switch allows rounding, down, up or 4/5 in the off position. The above features and functions are well known in the art and operate in the normally accepted and understood manner.

Further, the calculator of FIG. 1 includes programming alphabetic keys 11 and prompted response keys 6–10. When in the "learn" mode, which is attained in response to depression of the "learn" key (LRN), a series of operations corresponding to actuation of programming keys 11 in a desired sequence is stored as the steps of a program. Depressing these same keys 11 in the "learn" mode after operating the "alphabetic" (ALF) key causes alphabetic data to be entered into the program storage. This alphabetic feature allows the programmer to provide his own prompting messages in his own programs. Once the program steps, including prompting messages where desired, have been entered, depressing the "learn" (LRN) key again releases the calculator from the "learn" mode. The stored program may then be executed by depressing the "run" (RUN) key.

Table I depicts the operations associated with each of the programming keys 11. These programming functions are only illustrative of one calculator embodied in the present invention and it is understood that other programming functions can be provided to fill the particular requirements for the user. Since the programming functions are provided by internal programming, this is accomplished by changing the software which comprises the operating system of the calculator. This approach facilitates the implementation of any such other desired programming functions in addition to those hereinafter described.

TABLE I

| Key | Operation |
|---|---|
| LEARN (LRN) | Actuating this key once will switch the calculator into the "Learn Mode." An indication of the calculator being in the learn mode is evidenced by observing the display; first may be seen the present user instruction address indicated by the instruction pointer and second the three character code which represents the function stored at that position. Actuating the key again releases the calculator from the "Learn Mode" and restores the display to its original state. If a program is written which exceeds the number of program storage locations, the calculator will be released from the "Learn Mode" automatically after the last available location has been utilized. |
| HALT (HLT) | The HALT instruction associated with this key may be written at any point in a program where it is desirable to |

TABLE I-continued

| Key | Operation |
|---|---|
| | stop execution of the program. The user may also terminate execution of a program while it is in execution by actuating the HALT key until the program stops. When used in this manner, the stored program is not affected. |
| RUN (RUN) | Actuation of this key starts or continues execution of a user program (puts the calculator in the "Run Mode"). Execution proceeds at the program step number currently in the program counter. The RUN key may be actuated to write over an existing program step (while in the "Learn Mode"), in order to remove or delete that step. |
| STEP (STP) | When not in the "Learn Mode" actuating this key causes the program to execute a single next step. This enables the user to "Step" through his program and observe the execution a step at a time. While in the "Learn Mode," actuating the STEP key allows the user to check key codes in his program. STEP cannot be written into a program, and will not affect the program in or out of the "Learn Mode." |
| BK STP (BST) | Actuation of this key causes the same operation as STEP except that the instruction pointer is decremented by one rather than incremented. |
| INSRT (INS) | If actuated in the "Learn Mode," a zero instruction is inserted immediately after the current instruction pointer location and all of the following instructions are shifted up one location. The instruction stored in the highest instruction register is deleted. |
| DELETE (DEL) | If actuated in the "Learn Mode," the instruction at the current location is deleted and the address of all following instructions are decreased by one. |
| GOTO (GTO) | Actuation of this key must be followed by a decimal number which indicates the new value of the instruction pointer or the label address to which the program is to branch. |
| LABEL (LBL) | Actuation of this key indicates that the next key to be actuated is a label or instruction address and is not to be executed. |
| INDIRECT (IND) | This key is a prefix for memory functions which permits indirect addressing. |
| PAUSE (PAU) | Actuation of this key causes the current calculation to stop momentarily. The intermediate results are displayed for approximately ½ second and then execution is continued. |
| CLEAR PRG (RST) | Actuation of this key resets the user program instruction pointer to zero, resets the program flags, and erases all stored subroutine addresses. |
| LIST (LST) | Actuation of this key instructs the calculator to engage the printer and list the stored program, starting at the instruction stored in the location corresponding to the current instruction pointer. |
| SET FLG (SF) | Actuation of this key must be followed by a one digit decimal number to indicate which of the available 10 flags is to be set. If 2nd is pressed immediately before SET FLG, the specified flag is reset to zero. |
| IF FLAG (IFF) | Actuation of this key must be followed by a one digit decimal number which indicates which flag is to be tested, and this must be followed by a decimal number, or a label address which indicates where the program is to branch when the flag is set. If 2nd is pressed immediately before IF FLAG, the program branches when the flag is not set. In both cases, the branch number or label is ignored if the flag fails the appropriate test. |
| IF ERR (IFE) | Actuation of this key must be followed by a decimal number, or a label address indicating where the program is to branch when an error condition exists at the time of the test. If 2nd is pressed immediately before IF ERR, the program branches when an error condition does not exist. |
| IF POS (IF+) | Actuation of this key must be followed by a decimal number, or label address indicating where the program is to branch when the display is positive. If 2nd was pressed immediately before IF POS, the program branches when the display is negative. |
| IF ZERO (IFZ) | Actuation of this key must be followed by a decimal number, or a label address indicating where the program is to branch when the display is zero. If 2nd is pressed immediately before IF ZERO, the program branches when the display is not zero. |
| SUBROUTINE (SBR) | Actuation of the subtraction key followed by a label initiates a subroutine call, or branch, to the subroutine specified. |
| RETURN (RTN) | Branches to the location following the last subroutine call and continues. |
| ALPHA (ALF) | This key shift locks the calculator into alpha and can be used whenever a display alphanumeric data is desired and particularly to insert prompting questions for user programs. ALF must be pressed a second time to unlock the calculator from the alphanumeric mode. |
| QUESTION (QUE) | This question key is used in writing prompting programs and causes the calculator to await a user response before continuing execution of the program. |
| K ⇌ K | This key is used to place the calculator in the constant mode. When the key is actuated, the displayed value and last mathematical operation are saved. |
| READ/LOAD (RD) | This key is used to load (read) a program from magnetic cards. |
| WRITE/RECORD | This key is used to record (write) a program onto magnetic |

TABLE I-continued

| Key | Operation |
|---|---|
| (WRT) | cards. |

In addition to the programming keys 11, and in accordance with an embodiment of the present invention, a special set of response keys 6–10 are provided which allow the user to readily respond to the programmed prompting messages which appear on the alphanumeric display or printer. For example, as shown in FIG. 1, the illustrated calculator is displaying an inquiry as to whether the user desires prompting, i.e., does the user desire that the calculator instruct the user as to the next input it requires?0 Obviously, when utilizing only the basic four functions, prompting is not desired. Accordingly, the "NO" response key 7 would be actuated, whereas, if prompting were desired, then the "YES" response key 6 would be actuated. If a response is requested which is not relevant to the specific problem being solved, then the "not applicable" (N/A) key 8 is actuated. If a program is stored which can be executed to solve for one or more unknowns in a group of variables, a prompting message may require the specific unknown to be identified in which event the "unknown" (UNK) key 9 is actuated. Whenever data is input through the keyboard 1 to the prompter, the "enter" (ENT) key 10 is actuated immediately subsequent to actuation of the data key.

A graphic illustration of a typical problem and input sequence is as follows. Assume the user wishes to fit a straight line of the form $Y = MX + K$ to a set of three points on a cartesian plane. For the purpose of this example, assume the three points, $(X_1, Y_1)$, $(X_2, Y_2)$, and $(X_3, Y_3)$ are defined by (4,5), (7,7), and (10,8). A linear regression program may be entered from the keyboard or may be loaded from a preprogrammed magnetic card. More than one program may be stored on such a magnetic card. If the entire card is loaded, it will be necessary to determine which program is to be used. Table II below illustrates the sequence of prompting messages and user responses for this typical problem.

TABLE II

| Message Visually Displayed on Calculator Display/Printer | User Response |
|---|---|
| BLANK | TURN POWER ON |
| "0" | Press QUE |
| "PROMPTING DESIRED?" | Press YES |
| "GEOMETRIC PROGRESSION?" | Press NO |
| "LINEAR REGRESSION?" | Press YES |
| "ENTER $X_1$" | Press 4 ENT |
| "ENTER $Y_1$" | Press 5 ENT |
| "ENTER $X_2$" | Press 7 ENT |
| "ENTER $Y_2$" | Press 7 ENT |
| "ENTER $X_3$" | Press 10 ENT |
| "ENTER $Y_3$" | Press 8 ENT |
| "ENTER $X_4$" | Press N/A |
| "SLOPE" | |
| ".5" | Press RUN |
| "INTCP" | |
| "3.1667" | |
| "COMPUTE Y?" | Press RUN |
| "ENTER X" | Press YES |
| "NEW Y" | Press 5 ENT |
| "5.6667" | |

The line matching the entered points is defined by $Y = .5X + 3.1667$, and $X = 5$, the program computes $Y = 5.6667$.

A program such as the one described in Table II may be written from keyboard 1 of the calculator as previously described, or it may be entered from a storage media such as a magnetic or punched card or tape with a suitable reader/writer mechanism. Also, programs entered from the keyboard may be recorded on such information storage media for future use. Preprogrammed cards or tapes may be provided by the manufacturer of the calculator for common calculation problems in various disciplines such as electrical, engineering, business/finance, surveying, medicine, statistics, mathematics, and general science.

A further feature of the illustrated embodiment of FIG. 1 is the set of user defined function keys, "$e_1$"-"$e_{15}$". These keys allow the user to define functions in addition to those internally provided, such as "$e^x$", "$X^2$", "%", etc. The user can define functions by entering them from the storage media or by programming them from the keyboard.

Referring now to FIGS. 2a and 2b, a block diagram of one embodiment of the calculator of FIG. 1 is shown. The block diagram of this embodiment shows different functions of the calculator being split up on different semiconductor chips. Although this is a convenient means of implementing the calculator, it is obvious that the different functions may be combined on any number of chips or rearranged in any convenient manner. An example of one such other arrangement will be discussed in further detail with respect to FIG. 15.

In the embodiment of FIGS. 2a and 2b, fifteen interconnected MOS/LSI semiconductor chips are shown including an arithmetic chip 15, SCOM (scanning read-only-memory) chips 16-19, an external data memory chip 20, a clock/voltage regulator chip 21, a display chip 23, a printer chip 22, a programmer chip 400, four program storage shift register chips 450, and a card reader/writer chip 500. Not shown in FIGS. 2a-2b, but understood to be included in the complete system, is the thermal printing mechanism 4 as indicated in FIG. 1, such as a North American Phillips Motor No. B82203-M4 coupled to a Texas Instruments Thermal Printhead No. EPN-3100. Conventional digit and dot drivers are utilized in conjunction with a series of 5 × 7 dot VLED display elements. Like positioned dots in each row of the display elements are commonly connected, with each row being individually addressable as will be explained with respect to FIGS. 8a to 8b. Also understood to be included in this embodiment is a magnetic card reader/writer mechanism of the conventional type utilized in programmable desktop or hand-held calculators.

Functional operation of the system of FIGS. 2a-2b will be explained in detail subsequent to a brief description of the signal representations transmitted over the various lines interconnecting the chips as shown.

The control signals generated by the arithmetic chip 15 include:

EXTERNAL (EXT) which indicates that the arithmetic chip is addressing an external chip such as printer chip 22, or SCOM storage 16 and indicates which ROM storage therein (constant or program) is being addressed. The EXTERNAL control signals further communicate in multiplexed bit fashion the HOLD and CONDITION control signals. The EXT signal also communicates data to the printer/display chips 22 and 23 and transmits 7 bit codes between programmer chip 400, card reader/writer chip 500, and arithmetic chip 15, representing each user programming step;

The HOLD bit in the EXTERNAL control signal indicates that an interrupt is desired in the normal sequencing of the ROMs in the SCOMs to allow additional executions by the sytem before the next instruction word is to be executed;

The CONDITION (COND) bit in the EXTERNAL control signal indicates that a condition flag has been set, the status of a particular flag or the results of a comparison of flags;

IDLE (IDLE) which is indicative of the idle condition of the data chip, i.e., whether the data chip is actually in the calculating mode (non-idle) or in the display or scanning mode (idle), and provides synchronization of the timing generators of the SCOMs, the programmer chip 400, the card reader/writer chip 500, and the printer 22 and display 23 chips to the timing generators of arithmetic chip 15;

FLAG A (FLGA) which is the serial out of the Flag A register in the sequentially addressed memory or SAM at an output rate determined by COND;

FLAG B (FLGB) which is the serial output of Flag B register in the SAM of arithemetic chip 15 or is the first bit (B1) of the B register output;

DISPLAY TIME (D TIME) which comprises an instruction cycle of, for example, sixteen S times in duration with each D time repeated in cycles of, for example, sixteen. Thus, in the present embodiment, each D time is active for a duration of sixteen S times once every sixteen D times;

KEYBOARD INPUTS (K LINES) which are signals from the keyboard for entering external commands to arithmetic chip 15;

INSTRUCTION WORDS (IRG) which indicate the particular instruction word comprising thirteen bits ($I_0$-$I_{12}$) stored in a particular SCOM memory storage unit; and BUSY (BUSY) which indicates the condition of peripheral chips such as printer chip 22. For example, a BUSY signal generated by the printer chip 18 indicates that the printer is/is not busy and therefore can/cannot receive another command for printing.

The INPUT/OUTPUT (I/O) buses comprise data lines for transferring data bits to and from any of the various data registers and memories located in the arithmetic chip, SCOM chips, and register chips.

Referring again to FIGS. 2a and 2b, the arithmetic chip 15 provides output data information from registers B and/or A and Flag register A to the display chips. The segment and digit drivers (not shown) comprise conventional driver circuits for actuating the above-mentioned display 3 and printer 4.

The SCOM chip provides the D time signals which selectively scan the keyboard in order to determine which keys are being actuated. The D time strobing of the keyboard is discussed in further detail with respect to FIG. 10.

SCOM chip 16 is responsive to EXT and $\overline{IDLE}$ command signals from arithmetic chip 15 and generates in response thereto the D times, as discussed above, the instruction word $I_0$-$I_{12}$, (IRGA and IRGB) and data from the constant ROM on the I/O lines, all of which is communicated back to the arithmetic chip and to the data memory chip 20.

The ROM chips 17-29 of this embodiment are similar to SCOM chip 16 and allow expanded calculator instruction memory capacity. ROM chips 17-19 are responsive to the EXT and $\overline{IDLE}$ commands from arithmetic chip 15 for providing 1024 additional instruction word capacity for each additional ROM chip.

Multi-register chip 20 is another peripheral chip of the illustrated embodiment providing expanded data storage capacity for the calculator system of this invention. The register chip which may contain 10, 20, 30 or any other desired number of registers is responsive to Flag A, IDLE, and I/O information from arithmetic chip 15 for providing store and recall data through the I/O lines in communication with arithmetic chip 15.

In this particular illustrated embodiment, programmer chip 400 is an external semiconductor chip which operates in response to timing synchronization signals $\overline{IDLE}$ and internal instruction words IRG so as to provide sequential storage and recall of user program instructions which are tansmitted between programmer chip 400 and arithmetic chip 15 along the EXT line. The user program instructions are transmitted on the EXT line as eight bits of binary code, with seven of the bits thereof indicating the location on the keyboard matrix of the key representing the particular programming instruction entered. The eighth bit indicates whether the location represented by the other seven bits is defined as a symbol or as a program instruction. The method of storing user program instructions will be hereinafter described in detail.

Programmer chip 400 is connected to both the inputs and outputs of one or more banks of memory which in this embodiment are four shift registers 450. These shift registers 450 are of the conventional type such as the Texas Instruments TMS-3133, having 1024 bits serially connected. Parallel random access memories could also be utilized, for storage of user programs as well as user programs being stored in a common memory with data and other system operating parameters as will later be discussed in detail with respect to FIG. 15. The eight bit binary codes representing the user program steps and the alphanumeric data for prompting instructions are stored in these shift registers 450 in a manner such that each register contains two of the eight bits of the code. One bank of four 1024 bit shift registers may store 512 user program instructions. Additional banks of four shift registers may be serially connected to this first such bank to increase the available user program storage. Advanced by the ADV signal supplied by programmer chip 400, the shift registers 450 operate to circulate the eight bit program step codes sequentially through programmer chip 400.

Card reader/writer chip 500 receives the internal instruction words (IRG) and the synch signal, $\overline{IDLE}$. These signals, as well as the card sense (SENS) signal, determine the mode of operation of the reader/writer chip 500. When decoded, IRG supplies control signals to chip 500, and provides synchronized timing. The SENS signal, supplied by the card reading and writing mechanism (not shown) indicates the presence of a magnetic card in the mechanism, whether the card is moving at normal speed, and whether the card is "protected," i.e., cannot be written on. Reader/writer chip 500 also transmits/receives, along the EXT line, the eight bit binary codes representing the sequential user program steps. When reading, this chip 500 transmits, on the EXT line, the user program step codes to the arithmetic chip 15 from which they are supplied. The arithmetic chip 15 transmits these program steps, also on the EXT line, to programmer chip 400 and the user program storage which in this embodiment comprises shift registers 450. In the write mode, the program steps are received by card reader/writer chip 500 from the program storage via arithmetic chip 15 and the EXT line. The reader/writer chip 500 drives the magnetic heads of card writing mechanism and supplies signals which operate the motor and various other parts of the reading/writing mechanism. A BUSY signal is also supplied by magnetic card reader/writer chip 500 to indicate to the other chips of the calculator system that chip 500 has not yet completed a reading or writing task.

Printer chip 22 and display chip 23 are responsive to input/output information from the arithmetic chip and multi-register chip 20 and to the EXT, and $\overline{\text{IDLE}}$ command signals from the arithmetic chip for printing and display in accordance with data on the I/O lines.

A better understanding of the calculator system will be realized when reading the following functional description of the specific circuits comprising the blocks of FIGS. 2a and 2b.

Figure 3A:
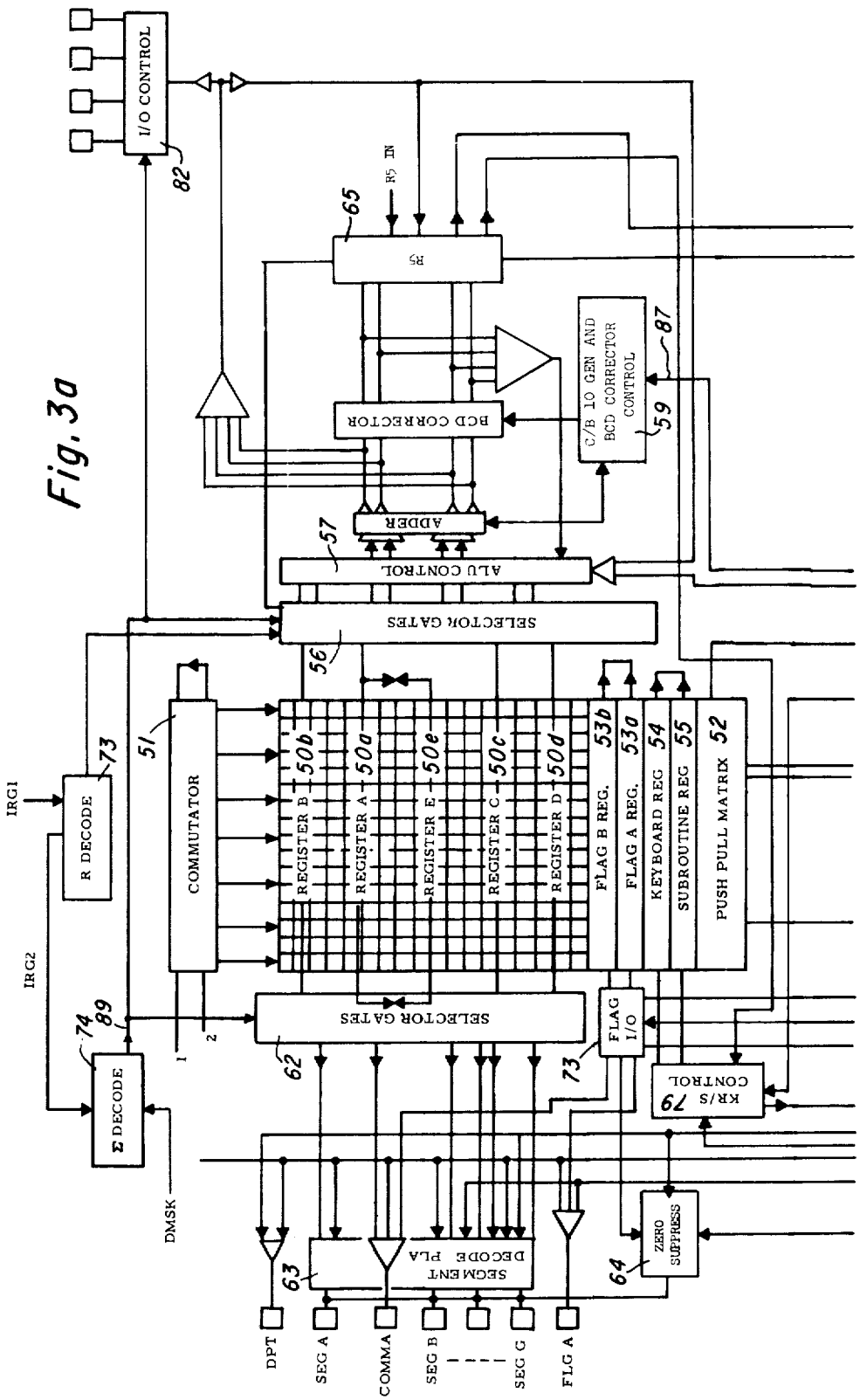
Figure 4:
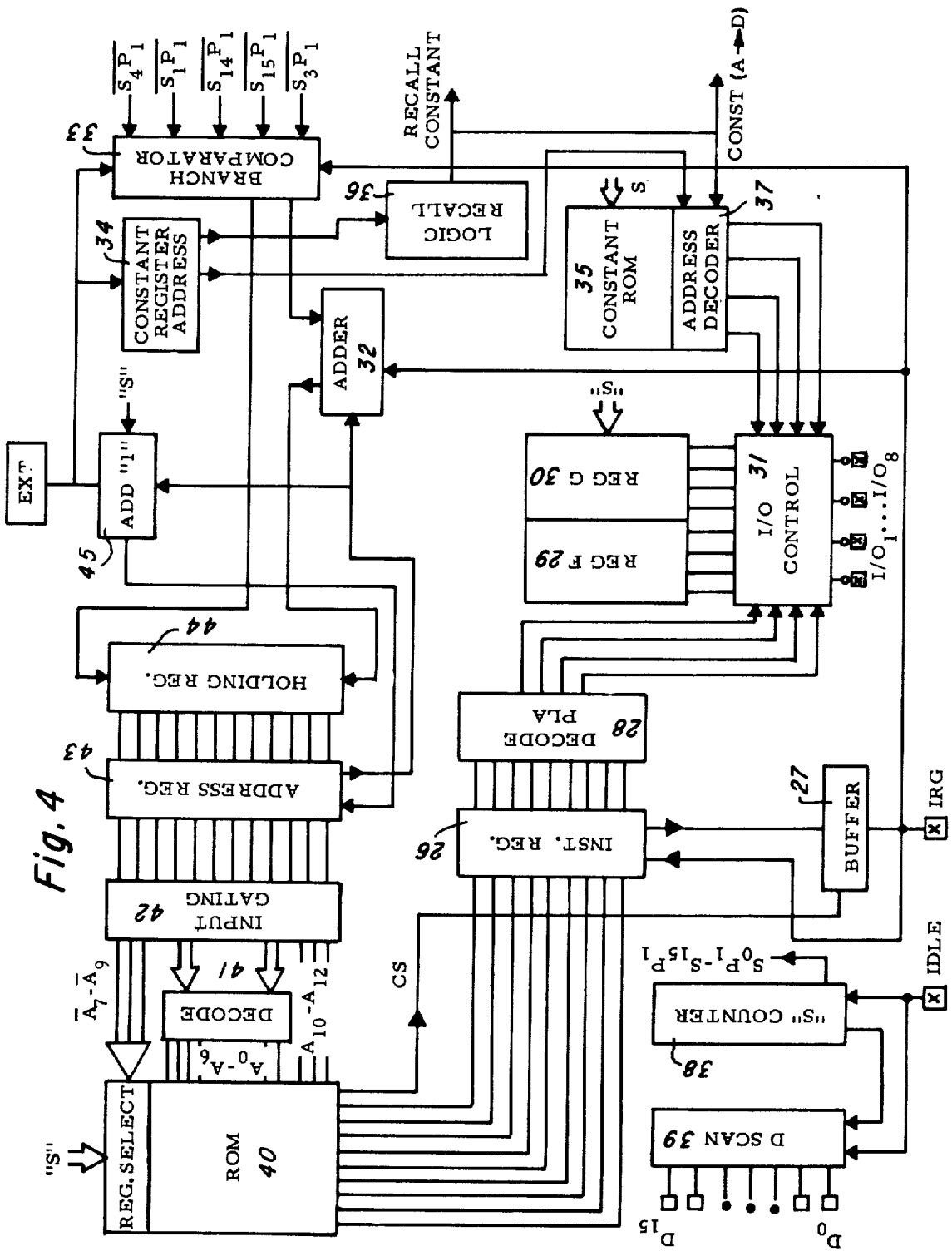
FIG. 4 is a more detailed block diagram of the SCOM chip of FIG. 2b.

Shown in FIGS. 3a-3b and FIG. 4 is a detailed functional block diagram of arithmetic chip 15 and SCOM chip 16 depicted in the calculator system of FIGS. 2a-2b. A detailed description of the circuits of the arithmetic and SCOM chips is found in copending application, "Multi-Chip Calculator System," Ser. No. 397,060, filed Sept. 13, 1973, by M. J. Cochran et al, which is hereby incorporated by reference. A brief functional description of these units is given here for convenience and clarity in understanding the present invention. It is understood that in the block diagrams of FIGS. 3a-3b and 4, a connection bus represented by a single line may represent a plurality of actual hard-wired interconnects, and for ease and simplicity of illustration, a single line may represent a plurality of different functions. SCOM chip 16 is comprised of a main program ROM 40 responsive to decode means 41 and gating means 42 which selectively couple an address word in address register 43 for selective addressing of the ROM. Holding register 44, in combination with add-1 circuit 45, selectively generates a new ROM address in register 43 when a branch instruction is executed. Branching is implemented utilizing a relative technique wherein, instead of the conventional method of inserting a complete new address, the old address is incremented positively or negatively by a selected amount to generate the new address.

Instruction register 26 is a parallel-in serial-out register responsive to the output of ROM 40 for storing the instruction word $I_0-I_{12}$ in parallel. Thereafter, the instruction word is serially communicated to arithmetic chip 15 to printer/display chips 22 and 23, to programmer chip 400, card reader/writer chip 500, and to data memory chip 20 via output buffer 27 which is under control of ROM 40.

Decode PLA 28 is responsive to instruction register 26 after the instruction word has been transmitted through buffer 27 and re-entered into instruction register 26. Decode PLA 28 decodes the instruction word thereby providing store and recall commands to register F and G, 29 and 30, respectively, and to constant ROM 35, through I/O control circuit 31. As shown in FIGS. 2a and 2b, SCOMs 17-19 are not connected to the I/O lines.

After the instruction word is transferred from buffer 27 to various chips as indicated above, it is further communicated to adder 32 and to branch comparator 33 wherein, if the $I_{12}$ bit of the instruction word indicates a branch is to be executed, the branch comparator enables holding register 44 to accept the new instruction word from adder 32. This causes the addition of a positive or negative increment to the old address storage received from address register 43 to generate the new address.

Constant register address 34 of SCOM 16 is responsive to a command word EXT from arithmetic chip 15 for addressing a constant stored in constant ROM 35. ROM 35, in this embodiment, provides up to sixteen 16-digit 4-bit per digit constant words. Logic recall circuitry 36 couples constant register address 34 to address decoder 37 of constant ROM 35.

Further incorporated on SCOM chip 16 is an S counter 38 and a D scan generator 39 for generating the S (segment) and D (digit) timing signals of the calculator system. The D times $D_0-D_{15}$ are outputed to the keyboard for keyboard scanning as well as to the digit drivers for display multiplexing as indicated in FIGS. 2a-2b. Both the D and S generators are synchronized by a command from arithmetic chip 15 which command is synchronized with the D and S times as they are applied to arithmetic chip 15.

Arithmetic chip 15 is responsive to instruction words (IRG) from SCOM chip 16 and to external user inputs from the keyboard, the user program via programmer chip 400, a stored program via card reader/writer chip 500, and other input from other peripheral chips for executing particular instruction words and performing indicated arithmetic operations. The main data registers in this particularly described embodiment are registers A-E, 50a-50e, respectively. They are implemented as sequentially addressed memories (SAM) which are driven by a commutator 51. The commmutator 51 also drives a push/pull matrix 52 for generating timing signals.

Four 1-bit registers utilized as two flag registers, Flag A, 53A; Flag B, 53B; the keyboard register 54, a multi-purpose register; and a subroutine register 55 are also implemented as SAMs. Although SAMs are shown in the present embodiment as providing the register function, it is understood that conventional shift registers or other memory means could be utilized to provide this function. Data in registers A-E is acted upon by adder circuit 55 as controlled by selector gates 56, ALU control 57, carry/borrow generator and BCD corrector control circuit 59, and BCD corrector 61.

Selector gates 62 control exchanging and recirculation of registers A-E. The calculator displays its results by outputing the contents of register B and/or register A, preferably register A, and Flag A register into keyboard register 54 through register R5, 65, from which it is bussed on the EXT lines to printer/display chips 22 and 23 for output as shown in FIGS. 2a-2b. The keyboard register of the present embodiment is also implemented as a SAM with each bit being addressable for individually setting the state thereof.

A fifth 1-bit four digit register, register 5, 65 is a multi-purpose register responsive to the output of adder circuit 55, to I/O lines, and to the instruction word from Flag Decode PLA 72. R5 control 66 provides control data inputs and control inputs to register 5 responsive to decoded instruction information. A feature of the present embodiment described is the provision of means allowing four bits of the instruction word to be entered into register 5 upon a "NUM R5" command. Since register 5 is coupled to the main SAM registers and to the ALU, such provision allows use of a subset of the instruction word as data for execution. Such a feature not only facilitates software generation of data required in various subroutines, but also allows addressing of printer chips 22 and 23 for display of the prompting message as is further discussed in detail with respect to FIG. 12.

Push/pull matrix 52 provides timing information to D time generator 67. D time generator 67 is a ring-tail counter which generates one D time or instruction cycle every sixteen S times. Generator 67 is cyclically decremented from 15 to zero causing the D times to appear to recess in sequence. D/S Test and Flag Mask Comparator 68 is responsive to S and D times for generating sync pulses and masking signals for flag operations, respectively, and for setting COND circuit 80. Wait generator 69 is responsive to D time generator 67 and to a decoder instruction word from decoder 72 for generating a wait command to logic and encoder 77 for controlling keyboard scanning.

The decimal point/D comparator 71 is responsive to the D times and to register 5, 65, for generating a decimal point at the proper time in the proper digit location and for zero suppression.

The instruction words from SCOM chip 16 are decoded locally on arithmetic chip 15. That is, the instruction words are initially decoded in mask decode PLA 50 which generates masks to the arithmetic logic unit for communicating such information as decimal point location, mantissa, and exponent location. The instruction word is then communicated to D/S flag mask comparator 68 and also to flag decode matrix 72 which controls input and output of the flag registers 53a and 53b through the flag input/output control 73. The instruction word also is communicated from mask decode PLA 50 to R decode matrix 73 and then to sigma decode matrix 74 which control the selector gates 56 and 62 for register selection/functioning.

A user supplies external inputs supplied to arithmetic chip 15 by means of keyboard 46 via K lines 47 and encode PLA 75. A particular keyboard actuation causes hardware clear circuit 76 to generate proper commands for initializing and resetting the calculator. Encode PLA 75 provides encoded K line information from the keyboard to logic and encoders 77 and to K comparator 78. Logic and encoder 77 selectively supplies D time and K coordinates in serial form to keyboard register/subroutine register control 79 for entry into keyboard register 54. A three bit binary code represents the particular K line to which the actuated key is connected. Similarly, a four bit binary code represents the particular D time associated with the actuated key. These codes provided by the logic and encoder 77, are supplied together as a seven bit code in serial form to the keyboard register/subroutine register control 79 for entry into keyboard register 54. From the keyboard register 54, this seven bit code may be supplied along the EXT line, to programmer chip 500 for storage or to card reader/writer chip 500 to be written onto a magnetic card. Depending on the current operating mode of the calculator system this code also may determine the next operation to be performed. In addition to the seven bits of the code, an eighth bit is set in keyboard register 54 to indicate whether the actuated key was intended to be a command or a symbol.

K comparator 78 is utilized in order to determine that a specific one of the K lines was not actuated; or conversely, by a process of elimination, determine which K line was actuated. This information is communicated to a condition circuit 80 which is comprised of a versatile latch device with gated inputes responsive to a plurality of functions for providing status of various conditions at preselected times. Idle latch 81 is responsive to the flag decode PLA 72 and provides information to the display output controls indicative of the calculator being in an idle or noncalculating state for appropriately blanking the display. This information is further communicated to the idle terminal as indicated for transmission to SCOM 16, programmer chip 400, card reader/writer chip 500, and printer/display chips 22 and 23 for synchronizing the S and D generators thereof.

The above described chip set utilizing SCOM 16 and arithmetic chip 16 (but not including programmer or card reader/writer chips 400 and 500) is now available commercially in the SR-50 calculator sold by Texas Instruments Incorporated.

Referring now to FIG. 5, there is shown a functional block representation of external data memory register chip 20 of FIG. 2b. A detailed description of data memory chip 20 is found in U.S. Pat. No. 3,958,223 assigned to the assignee of the present application. The detailed description found therein is hereby incorporated by reference, with a brief functional description of the operations of the logic circuitry in FIG. 5 generally reproduced for the sake of clarity and understanding.

Data memory chip 20 herein described with respect to the present embodiment contains, for example, ten registers implemented as a SAM 700. It should be understood, however, that any number of registers may be utilized in other calculators embodied in the present invention. SAM 700 is a sequentially addressed memory as described in U.S. Pat. No. 3,893,088 assigned to the assignee of this application; the particular type of SAM used in a preferred embodiment of this invention is described in U.S. Pat. No. 3,851,313 and assigned to the assignee of the present application. Memory 700 may have, for example, 640 bits of storage arranged as 10 registers of sixteen 4-bit BCD digits each. A state counter 701 generates state times $S_0$ to $S_{15}$ which corresponds to the state times in arithmetic chip 15. State counter 701 is a ring counter of contemporary type. Timing matrix 702 is connected to memory 700 and is actuated by the same timing signals which sequentially address memory 700; matrix 702 generates a number of timing signals to control logic 721 via line 722 for use in the chip at various points. Data in memory 700 is selectivley operated upon under control of selector gates 703 and 704. For example, data is selectively input, output, recirculated, right shifted, or cleared in memory 700. In this particular embodiment, data input, recirculate and clear functions are implemented by selector gates 703 while the data output and right shift functions are implemented by selector gates 704. Data in input from input/output pins I/O (1, 2, 4, 8) which are connected via connection 705; data output is to the same I/O pins via connection 706 and I/O buffers 707. Selection of a particular register among the ten in memory 700 for the purpose of entering data therein or clearing the register is accomplished by input register select decoder 708 and selection of a particular register to be read out of is accomplished by an output select decoder 709. Outputs 710 and 711 of decoders 708 and 709 function to open and close selected gates within the groups of selector gates 703 and 704 to perform the desired function. The input and output selection decoders 708 and 709 receive outputs from an address logic circuit 712.

Register chip 20 is addressed by a selectively chosen portion of a data word appearing on the I/O pins, which portion is determined in accordance with a particular gate program masking step during manufacture. A format for a data word typically is sixteen digits of four bits each with only the first four digits being utilized. The least significant digit, occuring during time $S_0$, is ordinarily used to indicate the position of the decimal point; in register chip 20, $S_0$ is used to define the operation to be performed. Within the least significant digit 713 or $S_0$, the least significant bit indicates either an input or an output function, i.e., the $S_0$ "1" bit signifies input function by a "1" and an output function by a "0". The other three bits are used to signify either input of data or clear the registers. Clear is a special case of data input because zeros are inputed; several possibilities of clear operations exist, these being (1) clear a specific register in a specific chip, (2) clear all registers in a specific register chip, or (3) clear all register chips. The "2" and "4" 0 bits in $S_0$ time define which of these clear functions shall occur; the specific bits and their code are gate programmable in address logic circuitry 712. One of the registers is defined by a four bit code sent during the $S_2$ time; this appears on the I/O pins in parallel, and is stored in the proper place in address logic circuitry 712 via input 716 and decoded in register select decoders 708 and 709. For example, if an output operation from register seven was desired, the first digit would be 0000 and the $S_2$ digit would be binary seven or 0111. The third item in the address word is the chip select digit occurring at $S_3$. One of the register chips, in this embodiment one of sixteen, is selected by the four bit binary code occuring at $S_3$. The $S_3$ digit is received by address logic circuitry 712, stored, and applied to chip select logic 717. Four pins 718 are provided external to the register chip 20 package, and are selectively connected to either "1"$V_{SS}$ or "0"$V_{DD}$ to define a four bit code for a particular application of the register chip. Then, when the four bit chip select digit 715 applied to chip select logic 717 via connection 719 from address logic 712 matches the code wired into the pins 718, a select signal is applied back to the address logic via connection 720 to enable chip 20 to execute the designated operation. Another input $\overline{CS}$ to chip select logic 717 provides higher order chip selection, i.e., for other embodiments employing more than sixteen register chips.

In order to cause reigster chip 20 to accept a data word as an address and perform the desired function, a flag is generated in arithmetic chip 15 and outputed via FLGA pin, from whence it is received at FLGA pin of register chip 20 and applied to control logic 221. If this special enabling function were not provided, register chip 20 data ordinarily appearing on I/O pins with an address word as in FIG. 3 could not be distinguished. A dedicated flag is used in the arithmetic chip program to indicate that the register chips 20 are to be addressed. This may be a flag in Flag A register at time $S_{14}$, for example. Also, since flags are used to send annotations to the display, e.g., minus sign, error, overflow, etc., the IDLE designation, as described, by CONB, in the above referenced patent application, Serial No. 444,226 for "Expandable Electronic Calculator," filed Feb. 20, 1974, is used to distinguish between the arithmetic chip being in the idle or not idle operating condition. IDLE signal is also applied to control logic 721 as shown in FIGS. 2a–2b. When $\overline{IDLE}$ is zero, the data chip is in idle or display mode and the flags are in time with D's or D times; at such time, register chip 20 is not addressed, so that flags are ignored at logic 721. When $\overline{IDLE}$ is one, the data chip is in not idle, and flags are in time with S times; at such time, a flag at register chip time $S_{14}$ will cause the register chip 20 to accept an address. Control logic 721 also generates several control signals used throughout chip 20 as will be described, and for this purpose receives timing signals from timing matrix 702 via connections 722, as well as signals to and from address logic 712 via connections 723.

An input instruction sequence for operating register chip 20 occupies four instruction cycles in arithmetic chip 15 (actually five in the ten register chip). The first instruction is "Set Flag"; during this instruction cycle a logical "1" is set in Flag A register at a particular S time, for example, $S_{14}$. This causes the control logic 721 to condition register chip 20, particularly the address logic 712, to receive an address. The next instruction is "Reg to I/O"; during this instruction cycle a register in arithmetic chip 15 is read out on the I/O lines, this register being B or C, for example. Whichever register is used, contains the address as seen in FIG. 3. The address is read into address logic 712 and stored. The third instruction is "zero flag" meaning that the Flag A register $S_{14}$ position in arithmetic chip 15 is reset to zero by an appropriate instruction word; this is to prevent the $S_{14}$ flag from inadvertently activating register chip 20 again. The fourth instruction is "A Reg to I/O" whereupon the contents of the A register in arithmetic chip 15 are presented to the I/O pins from which the sixteen digits of information in the A register may be written into the selected register in register chip 20. A delay of one state time in ALU 57 of arithmetic chip 15 in the path between the A register the I/O pins causes the information in the selected register of memory 700 of register chip 20 to be displaced one state time. For this reason, data entered in register chip 20 is right shifted by one state time so that when it is brought back into arithmetic chip 15 to be used in a subsequent operation it will be in the proper time position. So, during the instruction cycle, immediately following the "A Reg to I/O" instruction, register chip 20 automatically right shifts any data word just entered. This is accomplished by generating a one-instruction-cycle delay in a delay circuit 724, and applying the delayed signal to input register select logic 708. The right shift function is produced without an instruction word from the data chip; the program of arithmetic chip 15 can go on to other operations while register chip 20 is executing this automatic right shift function. The delay of one state time between the A register in arithmetic chip 15 and the selected register in register chip 20 results in another operation in addition to right shift. That is, the sixteenth digit, at $S_{15}$, does not arrive until $S_0$ of the next cycle during which automatic right shift is occuring. So, to avoid overlay, the sixteenth digit is held in a sample-and-hold circuit 725 until $S_{15}$ of the next or automatic right shift cycle, then it is inserted in the $S_{15}$ slot. Thus, only fifteen digits go through right shift, the sixteenth is held and then inserted at $S_{15}$ of the following instruction cycle.

An output operation using four instruction cycles is simpler in that right shift is not performed on register chip 20. Again, the first instruction of arithmetic chip 15 is "Set Flag A at $S_{14}$." The second instruction word produces an address word serially on the I/O pins; the first digit of the address word is "0000" meaning output operation, the second digit is not used, and the third and fourth define register select and chip select. The third instruction word is "Zero Flag A at $S_{14}$." The fourth instruction word is "I/O to A Reg," in response to which the selected register in the memory 700 is outputted through connection 706 and I/O buffers 707 to the I/O pins and thence to A register 50a in arithmetic chip 15 via ALU 57. The delay in ALU 57 is again accounted for by communicating the first digit from register chip 20 one state time early; output occurs starting at $S_{15}$ of the third cycle and ending at $S_{14}$ of the fourth cycle.

Figure 6B:
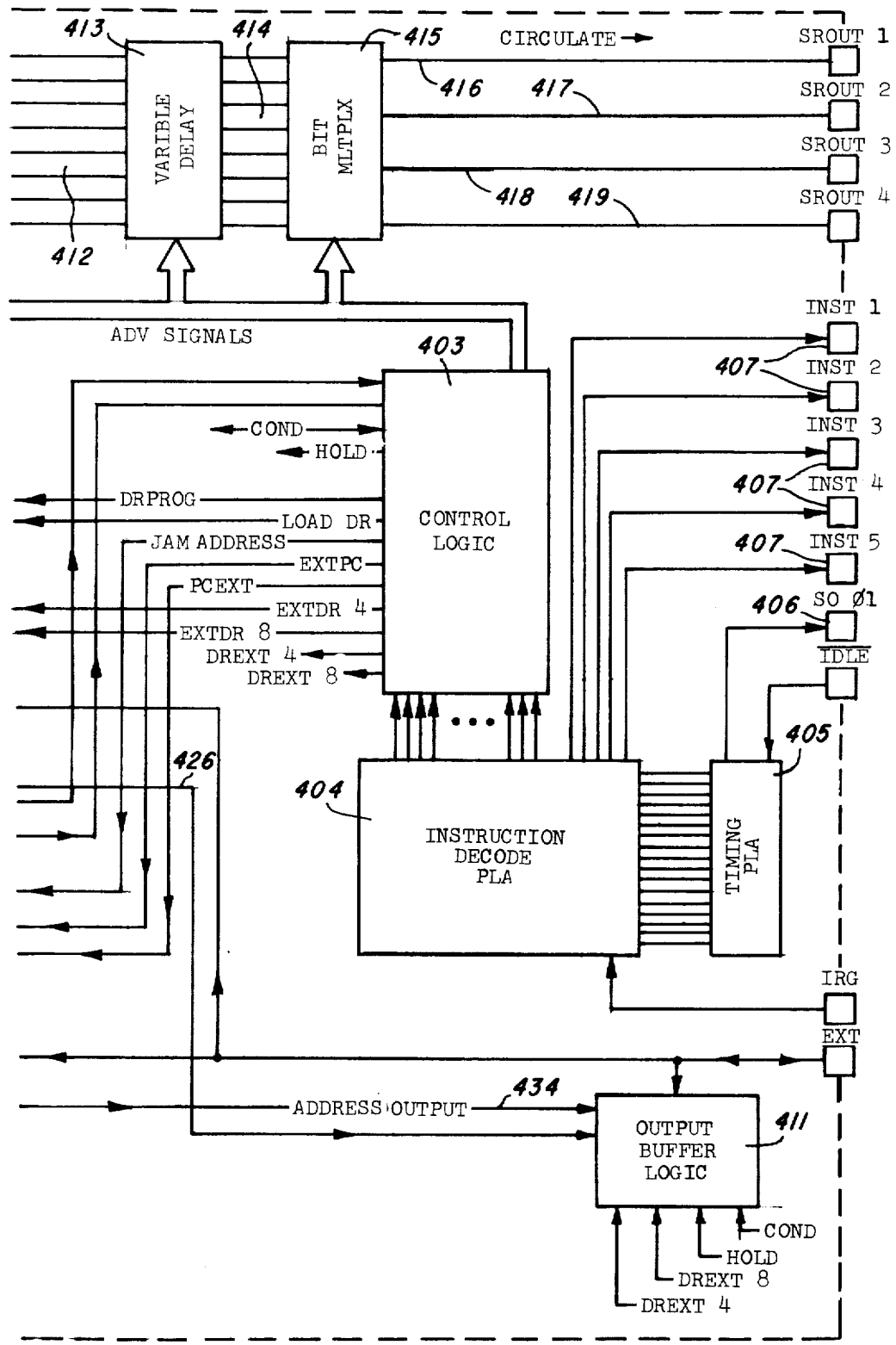

A detailed functional block diagram of a programmer chip 400 and one back of four program storage shift registers 450 utilized in an embodiment of the invention is shown in FIGS. 6a and 6b. An eight bit data register 401 having serial and parallel inputs and outputs receives serially on the EXT line (through the DRIN buffer logic 402) the eight bit code which represents the user defined program step from keyboard register 54 of arithmetic chip 15. As previously described, seven bits of this code indicate the keyboard matrix location of the key representing the particular programming instruction that was entered. The eighth bit is set to a "one" or "zero" depending on whether the seven bits represent a symbol or an actual program instruction to be performed. The transmission of the program step to the data register 401 is controlled in the DRIN buffer logic 402. Buffer 402, which operates to load the EXT signal into data register 401, is responsive to control signals EXTDR 4 and EXTDR 8 which are supplied by control logic 403 and instruction decode PLA 404.

Control logic 403 and instruction decode PLA 404 operate in conjunction to decode the calculator system's internal instruction words (IRG) and provide suitable control signals which cause the various components of the programmer chip 400 to carry out the operations commanded by the instruction word (IRG). A timing PLA 405 receives the timing synchronization signal $\overline{IDLE}$ from arithmetic chip 15 and uses this signal to synchronously generate timing signals which are supplied to instruction decode PLA 404 and other parts of programmer chip 400. One of the state times generated by the timing PLA 405 is applied to an output pin 406 of programmer chip 401. The signal at output pin 406 may be used to provide timing for peripheral devices such as an X-Y plotter (not shown) without the necessity of providing an additional timing PLA in the peripheral device. In addition to supplying timing for peripheral devices, programmer chip 400, through the use of spare instruction decode capability in the instruction decode PLA 404, may provide, in response to instruction words (IRG), control signals on output pins (INST 1 - INST 5) 407 for peripheral devices. Other signals provided by control logic 403 and their operative functions will be hereinafter described with respect to the various portions of programmer chip 400 to which they are applied.

Data register 401, which contains an eight bit binary code representing a user program step, has eight parallel input/outputs which are connected through gates 408 to a one-bit delay provided by delay circuit 409. The gates 408 are operated by control signals LOADDR and DRPROG supplied by the control logic 403 and instruction decode PLA 404. These signals are produced so as to insert the contents of the data register 401 into the stream of circulating program step words if programmer chip 400 is in the "store program" mode and so as to transfer one such program step word into the data register 401 from the circulating sequence of steps if chip 400 is in the "recall program" mode. The mode of operation of chip 400 is, of course, determined by the calculator system's current internal instruction word (IRG). The one bit delay provided by the delay circuit 409 is utilized so that eight bits from the data register 401 are inserted into the circulating sequence of eight bit program step words. This delay also allows the transfer of a program step word from the circulating sequence to data register 401. Once eight such bits are transferred to data register 401 from circulating lines 410 (in the "program recall" mode), the eight bit code thus stored in the data register 401 may be serially output to the output buffer logic 411 along line 426.

Output buffer logic 411 operates in response to COND and HOLD signals, as well as other control signals produced by control logic 403 such as DREXT 4 and DREXT 8. As determined by the condition of these signals, output buffer logic 411 transmits the contents of data register 401 serially along the EXT line to keyboard register 54 of arithmetic chip 15. In this manner a program step is recalled. Once the binary code representing a programming key-push or program step has been returned to the keyboard register 54, the arithmetic, SCOM, ROM, and multi-register chips 15-20 operate just as if the binary code had been entered into the keyboard register 54 from the keyboard rather than from program storage.

Output buffer 411 operates, in conjuction with tri-state buffer 86 of arithmetic chip 15, to enable the transmission of data along the EXT line to keyboard register 54 of programmer chip 400. Keyboard register 54 is continuously circulating its contents. The contents of keyboard register 54 are shifted through tri-state buffer 86 and back to the input of the keyboard register. By lowering the impedance of the output buffer 411 (lower than that of tri-state buffer 86), the data being transmitted to arithmetic chip 15 on the EXT line may be written over the data being circulated in keyboard register 54. This method of transmitting data is advantageous because it eliminates the need synchronizing data transmission.

In this embodiment, user program storage is provided by storing a sequence of eight bit binary codes (program step words) representing a sequence of programming key-pushes including, if desired, alphanumeric key-pushes which thereafter provide in execution alphanumeric prompting messages on the display or printer of the calculator. More specifically, one or more banks of four 1024 bit shift registers 450 serially connected as shown in FIG. 6a provide for storing the sequence of program steps or alphanumeric characters. The shift registers 450 are caused to shift by the occurrence of a control signal ADV from the control logic 403 and shifting may thus be stopped and restarted as required. The ADV signal is supplied to shift registers 450 from output pin 420.

When the system is in the "store program" mode, the eight bit binary code (a program step word) is serially applied to data register 401 (through the DRIN buffer 402) from keyboard register 54 via the EXT line. The program step word is then output in parallel from data register 401 through gates 408 to delay circuit 409 where it is applied to lines 412, one of the eight bits being applied to each respective line. The program step word is circulated to the right through variable delay circuit 413 where, depending on the advance signals applied, the program step word is selectively delayed for zero, one, or two bits. The variable delay is provided so that program steps may be inserted or deleted while a program is being written and stored. Under normal circumstances, when no insertions or deletions are required, the program step words are delayed by one bit and then advanced.

When an insertion is desired, the program step words immediately following the point at which the insertion is to be made are each delayed for two bits and the entire sequence is circulated until the last memory location is reached. In this manner, all the program step words following the point at which an insertion is desired are effectively moved back one location. This process preserves the order of the original words and leaves one location at which the desired word may be inserted. After circulating to the last memory location, the varible delay circuit 413 returns to its normal one bit delay and the sequence of program step words is initialized and circulated through programmer chip 401 until the blank location is reached. The insertion is performed by impressing the inserted program step word from the data register 401 onto the eight parallel lines 412. For deletions, the variable delay circuit 413 provides no delay to the circulating program step words following the word which is to be deleted. The variable delay circuit 413 returns to its normal one bit delay after the final program storage location is reached. All program step words are thus moved up by one program storage location.

The various advance signals, used to operate variable delay circuit 413, are supplied by the control logic 403 (in response to appropriate instruction words (IRG) decoded by the instruction decode PLA 404). From variable delay circuit 413 the program step word is advanced along parallel lines 414 to bit multiplexer 415 where bits one and two are, for example, applied to line 416 one after the other. A similar operation is performed on all eight bits. The four lines 416–419 carrying the eight bits of the program step word in two shift times are applied from output pins, SROUT 1 - SROUT 4, to the inputs of four shift registers 450. Since the serial outputs of the four program storage shift registers are connected to four input pins of programmer chip 400, SRIN 1 - SRIN 4, the sequence of program step words is being circulated through shift registers 450 and programmer chip 400 as the shift registers are advanced. In this additional embodiment, additional banks of four shift registers 451 might be provided to increase the program storage capability. Each additional shift register 451 merely extends the number of available bits of one of the already present registers 450 to increase the number of program step words which can be stored. Although any number of shift registers may be utilized in any bank, the use of banks of four shift registers is advantageous in this embodiment since it eliminates the requirement for additional programmer chip input/output pins. Eight additional pins (four additional input pins and four additional output pins) would be needed if banks of eight shift registers were utilized. Further, the operation of programmer chip 400 is not hampered by the external slowing of the program step word circulation frequency to one half its value inside the programmer chip 400. A program step word is circulated through the program storage registers 450–451 in a bit multiplexed fashion as provided by the bit multilexer 415. Once the program step word has been fully circulated and is returned to the programmer chip input pins, SRIN 1 - SRIN 4, it is conducted to the demultiplexer 421 on four parallel lines 422- 425, is demultiplexed, and the eight bits of the word are produced on the eight parallel lines 410. The demultiplexer 421 is activated by ADV 1 and ADV 2 signals produced by control logic 403.

In this embodiment, the circulation of a sequence of program step words occurs in the same manner in both the "store program" and "recall program" modes. When "recalling" program step words, whether for the purpose of running the program and processing data, or in order to store the program on a magnetic card or tape, delay circuit 409 and gates 408 are operated by control signals from control logic 403 so as to transfer the eight bits on the eight lines 410 to data register 401. Thus, the current program step word in the sequence is stored in data register 401, fron which it may be serially transferred along line 426 to output buffer logic 411 and then to the EXT line. The program step word serially applied to the EXT line is transmitted back to the keyboard register 54 of arithmetic chip 15. Depending on the status of the calculator system's operation program and the current instruction word (IRG), the program step word in the keyboard register may be used so as to cause performance of some calculator operation just as if the user were pressing a key on the keyboard to load the keyboard register. Alternatively, the program step word may be transmitted from keyboard register 54 to card reader/writer chip 500 in order to store the step word on a magnetic card.

As has been previously descirbed, the programmable prompting calculator is capable of performing branch or "Go To" operations such that the user program may branch to a symbol or an address. This branching feature is, in this embodiment, implemented in the following manner. The user depresses "Label" and then some function key such as, for example, "Tan." This causes the keyboard register to place a "one" in the eighth bit of the program step word, thereby indicating that this word is a symbol and is not to be executed. As such, the symbol word is transmitted to data register 401 and inserted in the sequence of program step words in a normal manner. When the program is running, the symbol referred to by a branch instruction, in this example, "Tan" is loaded into the data register 401. Each program step word passing through delay circuit 409, as the sequence of program step words is circulated, is examined by the symbol comparator 427 and is compared to the symbol word in the data register. When the particular desired symbol word is located in the sequence of program step words, the symbol comparator 427 produces a symbol compare signal which is supplied to the control logic 403. The control logic causes the next program step word to be applied in parallel to the data register 401. This program step word is then transmitted to keyboard register 54 to select the appropriate calculator operation.

In order to perform a "branch to address XXXX" operation, the "address XXXX" is inserted in the program register 428 in 16 bit binary form from the EXT line through the PRIN buffer logic 429. The PRIN buffer 429 is responsive to control signals from the control logic 403. A program counter 430 contains the address of the program step word which is currently in delay circuit 409. As each word in the sequence of program step words is circulated in parallel on the eight bit lines 412 through delay circuit 409, program counter 430 is correspondingly advanced. Program counter 430, shift registers 450, and delay circuit 409 are all advanced simultaneously by the same signal ADV from control logic 403. The current sixteen bit binary program address in program counter 430 is supplied on lines 432 to address comparator 431 which compares the contents of program counter 430 to the desired sixteen bit branch address contained in program register 428 (supplied on lines 433) in order to determine when the desired branch address has been reached. When the desired branch address has been reached, address comparator 431 produces an address compare signal which is applied to the control logic 403. Control logic 403 in turn causes gates 408 to be operated so that the program step word at the desired address (presently in delay circuit 409) can be stored in data register 401 and transmitted to keyboard register 54.

In a "branch to symbol" operation, which has previously been described, the program address of the symbol found by symbol comparator 427 is in program counter 430. With the proper control signal, "Jam Address," applied to a set of gates in address comparator 431, the program address in program counter 430 and on lines 432 can be transferred to lines 433 and program register 428. The signal, "Jam Address" is produced by control logic 403. Once the precise program address of the symbol has been inserted in program register 428, it may be serially output on line 434, through output buffer logic 411, to the EXT line. The calculator system may in this manner receive and store the precise address of the symbol as well as the program step word stored immediately following the symbol.

The current program address in program counter 430 and on lines 432 is present in reset PLA 435 wherein reset signals are generated when the program address in program counter 430 reaches its upper limit. Although, in the presently described embodiment, using one or more banks of four 1024 bit shift registers are utilized to give program storage in increments such as 512, 1024, 2048, or 4096 bits, reset PLA 435 is implemented so as to produce a "Reset 1" signal when program counter 430 has counted, for example (with only one bank of four shift registers), from location "0" to location "499." Thus, the user may store 500 program steps with one bank of four program storage shift registers. In embodiments which have two or more such banks of four shift registers, the user may store, for example, 1000, 2000, or 4000 program steps. In such embodiments reset PLA 435 would produce a "Reset 1" signal when program counter 430 reached location "999," location "1999," or location "3999," respectively. The remaining locations are used for the storage of subroutines. When the "Reset 1" signal causes program counter 430 to be reset, the "Reset 2" means of reset PLA 435 is enabled so that when the program counter 430 has counted the remaining locations, the "Reset 2" signal is produced. The "Reset 2" signal causes program counter 430 to be reset to "zero," it may then begin counting the circulating program step words again.

Input pins, SR0, SR1, and SR2 are provided for indicating the number of banks of shift registers 450 in any particular embodiment to reset PLA 435 of such embodiment. A three bit binary number, representing the number of banks of program storage shift registers 450 are indicated on lines 436 by the selective connecting of pins, SR0-SR2 to ground or to a supply voltage. The three bit code supplied on lines 436 enables reset PLA 435 to determine the correct upper limit of program storage so that reset signals are produced at the proper point in the operating sequence.

FIGS. 7a and 7b illustrate a functional block diagram of magnetic card reader/writer chip 500 utilized in the present described embodiment of the invention. Not shown, but understood to be connected to card reader/writer chip 500, is a two channel magnetic card reader/writer mechanism having a four track head for magnetically storing information on a card and retrieving information from such a card. This type of mechanism is well known in the art and will not be described in detail here.

Similar to programmer chip 400, card reader/writer chip 500 is connected to the calculator system by the EXT line and receives the timing sync signal $\overline{\text{IDLE}}$ and internal instruction words (IRG). Card reader/writer chip 500 also produces a BUSY signal which is supplied to the calculator system to indicate that the chip is currently engaged in reading or writing and is not ready to accept (or provide) additional data.

Control of card reader/writer chip 500 is accomplished in a similar manner as that used to control the operation of programmer chip 400. The calculator system's internal instruction word (IRG) is applied to instruction decode PLA 501 where it is decoded to produce control signals to control logic 502 and buffer logic 503. The state times for the chip are produced in the state time generator 504 and are synchronized with the calculator system by the application of the synching signal $\overline{\text{IDLE}}$. The state generator 504 supplies sixteen state times, $S_O$–$S_{15}$, to instruction decode PLA 501 and adder 506 (which is associated with the timing PLA 507).

In response to timing signals, control signals (from instruction decode PLA 501), and the card sense signal (SENS, supplied on line 508 by the magnetic card reading/writing mechanism), read/write control logic 502 produces control signals to input/output buffer logic 503 and to the card reading/writing mechanism (not shown).

The SENS signal provided by the card handling mechanism on line 508 to control logic 502 indicates the status of the card reader/writer mechanism. This signal serves two functions. Initially it indicates the physical presence of a card; then the condition of the card, i.e., protected or unprotected. This input and those provided by instruction decode PLA 501 enable the control logic to produce control signals to external devices on lines 509–511 and to internal circuits on lines 512–514.

Line 509 supplies a voltage when needed to power the lamp in the reading mechanism which is used to determine (by an optical reading method) whether a card is present in the mechanism. Similarly line 510 supplies power, as required, to the motor which propels the magnetic card past the heads of the mechanism. As described above, the control logic produces a BUSY signal when unable to accept (or produce) data. In addition to these external signals, a number of control signals are produced which are inputs to various circuits within the card reader/writer chip 500. Two of these signals, $COND_1$ and HOLD, are applied on lines 512 and 513 to input/output buffer logic 503 to aid in controlling the transmission and reception of data (program step words) on the EXT line. The $COND_1$ signal on line 512 is produced by control logic 502 to indicate that the writing mechanism is disabled because the particular card currently in that mechanism is a "protected" card, i.e., is a card on which information has previously been permanently stored and which has been designated as "protected" so that no further information is written over that already stored. The HOLD signal on line 513 is supplied to buffer logic 503 in order to set the HOLD bit in EXT which instructs the calculator system to provide additional time, as has been previously described, for card reader/writer executions. The ON signal produced on line 514 is supplied to push/pull drivers 515 in order to turn on the buffers within the driver circuits when "writing" is to be performed.

Input/output buffer logic 503 provides control of the data flow (program step words) on the EXT line. In addition to the inputs from control logic 502, decoded instruction signals, EXTDR8 (EXT line to Data Register, 8 bits) and DREXT8 (Data Register to EXT line, 8 bits) are provided by instruction decode PLA 501.

The $COND_2$ signal on line 516, when set, indicates that the error detection and correction circuit 517 has detected two errors in sequence on a single track as it is being read from a magnetic card. As will be hereinafter described in detail, the error detection and correction circuit is capable of detecting and correcting an error in a sequence of data on any particular track. If two or more errors are detected in sequence on one track, the particular circuit of the present embodiment is incapable of making a correction. When error condition exists, the $COND_2$ signal on line 516 is set, causing buffer logic 503 to set the COND bit in the EXT data word. The system continues to operate until the entire card is read. The calculator system then tests the COND bit and, upon finding the COND bit set, causes an indication of the error condition to be displayed to the user of the calculator as, for example, by flashing the display on and off.

When the card reader/writer chip 500 is in the "write card" mode, as determined by the calculator system's current internal instruction word (IRG), a sequence of program step words is being serially applied to the chip on the EXT line (from the keyboard register 54 of the arithmetic chip 15). This sequence of program step words originates from program storage (via the keyboard register 54 and EXT line). Controlled by buffer logic 503, the eight bits of a program step word are serially shifted into an eight bit data register 518. Data register 518 has serial inputs and outputs as well as parallel inputs and outputs. Because chip 500 is in the "write card" mode, the contents of data register 518 are supplied, in parallel fashion, to multiplex PLA 519 on lines 520. With the input of timed sequential loading signals, $LD_1$–$LD_4$, bits 1, 3, 5, 7 and bits 2, 4, 6, 8 are output from multiplex PLA 519 on lines 521 and 522, respectively. The bits are shifted out of the multiplex PLA 519 one after another on lines 521 and 522 to transistion generator 523.

The scheme used herein for storing information on a magnetic card is well known in the art and will only be briefly described here. Generally, an NRZ code is used in which, for each channel, two tracks are provided. One of these tracks is used solely for storing "ones"; the other stores only "zeros." In a channel of data bits, each "one" causes a flux transition to occur on the "one" track, and each "zero" causes a transition to occur on the "zero" track. No flux change occurs on the "one" track for a "zero" bit, and no flux change occurs on the "zero" track for a "one" bit. The device within the card reader/writer chip 500 which produces the proper signals for implementing this method of information storage is transition generator 523. Receiving bits 1, 3, 5, 7 (channel one) on line 521 and bits 2, 4, 6, 8 (channel two) on line 522, transition generator 523 converts the two data streams (which are in standard binary form) into signals which implement the NRZ code. These signals, supplied on lines 524 to push/pull drivers 515, are used to selectively control the heads of the magnetic reading/writing mechanism. Push/pull drivers 515 are enabled only when the ON signal is present on line 514. As previously described, this signal is supplied by control logic 502 only when the reading/writing mechanism is ready to accept and store information on a magnetic card. Lines 525–528 from push/pull drivers 515 drive the four tracks. Note that lines 525 and 526 are respectively the "one" and "zero" lines of channel one, supplying $head_1$ ("one" head) and $head_2$ ("zero" head). Lines 527 and 528 supply the "one" and "zero" heads of channel two.

As an example, refer now to FIG. 8a, in which an exemplary eight bit program step word is shown in binary form. As multiplexed by multiplex PLA 519, the binary signals of both channel one and channel two, corresponding to the exemplary program step word, are shown in FIG. 8b as they appear (in binary form) on lines 521 and 522. FIGS. 8c and 8d depict the "one" and "zero" flux transitions produced by the magnetic heads in response to transition signals provided by the transition generator 523.

With reference once again to FIGS. 7a–7b, card reader/writer chip 500 enters the "read card" mode upon command from the calculator system, as determined by decoding the calculator's internal instruction word (IRG). Of course, information stored on a magnetic card which is to be read is stored in the NRZ code, and the mechanism which allows reading of the card uses the same four track magnetic head to read the four tracks of the two channel card. The lamp of the optical reading system and the motor used to propel the magnetic card are powered, as hereinabove described, by read/write control logic 502. A signal (SENS), indicating the presence of a card in the mechanism, is provided on line 508 to control logic 502. The proper signals to enable input/output buffer logic 502 are supplied from both the control logic 502 and the instruction decode PLA 501. In particular, DREXT8 (Data Register to EXT line, 8 bits) is applied to enable buffer logic 503 to output serially, on the EXT line, the contents of the data register 518. This signal, obtained by decoding the instruction word (IRG), indicates that the calculator system is ready to accept, on the EXT line, the program step words read from the magnetic card and deposited in the data register 518.

In the same manner as is utilized in the programmer chip 400 of the present embodiment for data transmission on the EXT line, output buffer 503 operates in conjunction with the tri-state buffer 86 of arithmetic chip 15, to enable the transmission of data along the EXT line to keyboard register 54 from the card reader/writer chip 500. The contents of keyboard register 54 is continuously being circulated by shifting the contents through tri-state buffer 86 and back to keyboard register 54. By lowering the impedance of output buffer 503 (lower than that of tri-state buffer 86), the data being transmitted to arithmetic chip 15 on the EXT line may be written over the data being circulated in keyboard register 54. As discussed above, this method of transmitting data is advantageous because it eliminates the need for synchronizing data transmission.

The stored information, on the magnetic card produces signals on lines 525 and 527 as the magnetic card moves. For example, the signals produced with the exemplary program step word of FIG. 8a is shown in FIG. 8e. The low level signals produced on lines 526 and 528 are shown in FIG. 8f. These low level signals, consisting of "up" transitions and "down" transitions, are amplified by four individual operational amplifiers 529 and, as amplified, are supplied to threshold detectors or trigger devices 530. Threshold detectors 530 operate to pass a pulse of uniform magnitude when the predetermined threshold is reached. These devices operate to filter noise from the card reader so as to prevent errors in the data. Trigger devices 530 also serve to separate the "up" and "down" transitions so that, for example, line 531 carries a signal indicating only "up" transitions on the "one" track of channel one, as is shown in FIG. 8g. The signal on line 532 is responsive only to "down" transitions on the "one" track of channel one. This signal is illustrated in FIG. 8h. Similar signals are produced on lines 533 and 534 for the zero track of channel one. See FIGS. 3i and 8j. Channel two operates identically to channel one. The signals on lines 531–534, as well as the similar signals on lines 535 for channel two, are supplied to the error detection/correction circuit 517 and are applied to two flip-flops 536, one per channel. At the outputs of these latches 536, the two channels of information read from the magnetic card have been converted to standard binary form with bits 1, 3, 5, 7 appearing sequentially on line 537 and bits 2, 4, 6, 8 appearing sequentially on line 538. These data bits on lines 537 and 538 are applied to the eight bit shift register 539 in the appropriate bit positions. When the shift register 539 is completely filled with all eight bits, a program step word has been read from the magnetic card and decoded.

As has been described with respect to FIGS. 8g–8j, the signals on lines 531–535 are supplied to the error detection/correction circuit 517. The signals on lines 531–534 completely define the four bits of data on channel one. Correspondingly, lines 535 carry signals determining the four bits of data on channel two. Operation of the error detection/correction circuit 517 will be herein described only with respect to channel one since the circuit 517 operates identically on channel two.

With reference to FIGS. 8g–8j, it may be seen that, for a four bit data word on channel one, a total or four pulses are produced on lines 531–534. These pulses occur at different times such that if lines 531–534 were applied to the input of an "OR" gate, the signal shown in FIG. 8k would appear at the output. If, however, the card reading mechanism should miss a flux transition stored on the magnetic card, one of the "one (zero)-up (down) transition" pulses as shown in FIGS. 8g–8j would not be present on lines 531–534. When applied to an "OR" gate, the output would be as shown in FIG. 8l. When it is detected that a pulse is missing on one channel, the next pulse appearing on one of the four lines of that channel is examined. Since there are two channels of data, each of which will produce a clock type signal at the output of an "OR" gate (as is shown in FIG. 8l), advantage may be taken of the redundancy in detecting whether a pulse is missing one channel. The error detection circuit examines individually each channel's clock type output, and a counter is started when a pulse is encountered on either channel at the output of that channel's abovementioned "OR" gate. If no pulse has been detected within a predetermined time at the "OR" gate output for the other channel, the error detection circuit determines that there is a pulse missing.

The principle upon which this error detection circuit operates is that for each track there should be a "down" transition between two "up" transitions or, conversely, an "up" transition between two "down" transitions. If such is not the case, a reading error has occurred; the reading mechanism is misaligned or has missed a bit. With reference now to FIGS. 8l–8p, it can be seen that, for example, bit five (the third of four bits in channel one) has been lost. Examining each of the two pairs of lines ("one" track and "zero" track) during the next bit time, the circuit determines that the next pulse occurs on the "zero-up" line (line 533). By examining latches set by the immediately previous pulses on both lines 533 and 534 ("zero" track), it is detected that there has been no pulse on the "zero-down" line (line 534) since the last pulse on the "zero-up" line (line 533). Because the pulses on the "zero-up" line directly represent "up" transitions on the zero track, and the pulses on the "sero-down" line represent "down" transitions on the zero track, this indicates that there has been no "down" transition between two "up" transitions. This is an error condition as hereinabove stated. The error condition is seen to exist on the zero track, and more specifically, a "down" transition on bit five has been missed. See FIGS. 8j and 8p. Error detection/correction circuit 517 pulls line 534 to $V_{DD}$ during bit five to correct the error. Bit five of eight bit holding shift register 539 is corrected, and the corrected program step word as read from channels one and two of the magnetic card may be transferred from shift register 539, to data register 518. Obviously if two bits are lost, no correction can be made since it is not possible to detect which line has dropped a bit. In such a case, an indication of this condition is made by setting $COND_2$ from which a signal is applied on line 516 to input/output buffer logic 503.

The program step word (corrected, if necessary) is supplied in parallel on lines 540 through gates 541, which are activated by a LOAD signal from timing PLA 507. From data register 518, the program step word is serially transmitted on line 542 to buffer logic 503 and on to keyboard register 54 of arithmetic chip 15 (via the EXT line). Of course, once the program step word has been stored in keyboard register 54, it may be transmitted to programmer chip 500 to be stored in sequence, or it may be immediately used to command operation of the calculator system by addressing portions of the main and constant ROM's.

Referring now to FIG. 9, functional block diagrams of the power supply and clock chip 21 of FIG. 2 are shown. A more detailed description of a clock ship similar to that utilized in the present embodiment is described in detail in copending patent application Ser. No. 329,008, entitled "Driver Means for LSI Calculator," filed Oct. 2, 1973 by M. J. Cochran and assigned to the assignee of the present invention. Modifications thereto in conforming to the below specifications are readily apparent to one having ordinary skill in the art. The driver chip 21 is responsive to an external supply voltage $V_{CC}$, typically at least one dry cell battery supply of 2–6 volts. It generates therefrom a $V_{DD}$ voltage, and clock voltages $\phi_1$ and $\phi_2$.

Driver chip 21 comprises a controlled bifrequency clock generator 126 which is responsive to a regulated voltage supply, an oscillator 128 and to a filter 124. Supply and oscillator 128 comprises a regulator of the type known in the industry as a switching regulator utilizing a catching diode and an inductor. Filter 124 comprises a conventional voltage doubler utilizing an L-C circuit. Referring to FIG. 2 once again, an RCL terminal is shown resistively coupled to circuit ground for setting the lower frequency of the two frequency clock systems. Terminals CC1 and CC2 are shown coupled to circuit ground through an RC network which determines the pulse width of the $\phi_1$ and $\phi_2$ clock signal outputs. Typically the pulse widths are each one microsecond with the $\phi_1 P_1$, $\phi_2 P_2$ cycle constituting a four microsecond cycle in the high frequency. In the low frequency, $\phi_1$ and $\phi_2$ typically are two microseconds each with $P_2$ and $P_1$ each equal to 12 microseconds duration. Terminal CDB is capacitively coupled to the IND terminal, which is itself inductively coupled to $V_{CC}$. The capacitor and inductor coupled to the CDB and IND terminals are the doubler capacitor and inductor utilized in the switching regulator above mentioned.

Referring now to FIG. 10, there is shown a detailed functional block diagram of both printer chip 22 and display chip 23 previously discussed with respect to FIG. 2g. A printer chip similar to chip 22 is described in detail in copending patent application Ser. No. 428,492, filed Dec. 26, 1973, entitled "Thermal Line Printer," by M. J. Cochran et al, assigned to the assignee of the present invention, which is hereby incorporated by reference. The description found in copending application "Strobed Alphanumeric Display System," filed Feb. 4, 1974 by Cochran et al and assigned to the assignee of the present invention teaches the slight modifications necessary to Ser. No. 428,492 for effecting display, which is herein incorporated by reference.

FIG. 10 is a block diagram of a large scale integrated circuit chip 618 which utilizes calculator outputs and controls for the purpose of driving a thermal printbar (as shown), to print on thermally sensitive paper characters which are formed on the basis of a dot matrix. The present example involves twenty 5 × 7 dot matrices for printing a line of up to twenty characters. As will be apparent, FIG. 10 is suitably modified for driving a twenty 5 × 7 dot VLED display.

A binary coded data stream from arithmetic and SCOM chip is received by way of line EXT leading to chip 618. Thirteen bit instruction words are derived from the read-only-memory of the SCOM. Instruction words are received by way of line IRG. A sync signal is received by way of the IDLE line and is a signal having known time relation to timing signals in the calculator, such as a programmed change of state at a specific D and S time.

The line 617 supplies to calculator 10 a signal indicating that chip 618 is busy, i.e., engaged in an assignment task not completed.

Components on chip 618 operate collectively to energize resistive-type heaters formed in the printhead 621. The printhead 621 comprises a linear array of 100 heaters 621a. Heaters 621a are arranged in sets of five. Collectively, twenty sets of five heaters per set span a thermally sensitive paper tape on which the output of the calculator is to be printed. For each character, the system prints a 5 × 7 matrix selectively one row at a time with the paper being stepped by a motor in the interval between printing of the successive rows. Each set of five heaters is spaced apart physically to provide space between printer characters. Twenty character strobe lines 622 are connected to printhead 621. Each of strobe lines 622 is connected to each of a set of five heater terminals. Column strobe lines 623 are five in number and are individually connected to the first, second, third, fourth and fifth heaters, respectively, in each set. More particularly, line 623a is connected to the first heater in each of the twenty sets. Line 623b is connected to the second heater in each of the twenty sets. Lines 623c, 623d and 623e likewise are connected to the third, fourth and fifth heaters, respectively, in each of the twenty sets.

A data stream on line EXT is supplied to a function programmable logic array 630, the output of which is stored in a storage device 631. One such storage device is a sequentially addressed memory (SAM) as now well known in the art and described in detail in above referenced application Ser. No. 163,565. The provision of such a decoder 630 allows communication of both character and function print data to be supplied on the same serial input, thereby minimizing pin requirements. SAM 631 stores a six bit word to designate by decoding each of the 20 characters that are to be printed by the printhead 621. A read-only-memory (ROM) 632 is provided to store a 35 bit code for each of 64 alphanumeric characters capable of being printed by a printhead 621. A bus 633 supplies the code from SAM 631 to ROM 632 for a one-in-seven decode and by way of a three line bus 636 for a one-in-five decode so that there is produced on the output line 637 a serial binary code which is stored in storage means 638 such as a shift register. When 20 bits are stored in shift register 638, representative of the locations of desired dots to be printed, selected heaters are energized locally to burn the thermally sensitive paper. The three line bus 636 is also connected to a decoder 639 to energize the five line output bus 623.

Sync timing pulses on line IDLE are applied to a state time generator 640, the output of which is applied to a MATCH logic 641. The timing generator 634 is also connected to MATCH logic 641, whose output is connected by line 642 to the generator 634 for synchronizing the same and for control of the time relationship of the signals on the output buses 635 and 636. Bus 635 is connected to a decoder 644 to control lines 619a which energize step motor 619. Motor 619 operates a mechanical linkage 619b to step thermally sensitive paper tape past the printhead 621.

Instruction words on line IRG are applied to an instruction decoder 648. The output of decoder 648 is applied to control logic 649 which is connected to various elements throughout the system as will be shown.

A general functional description of the load-print cycle is as follows. A zero print command (ZP) over IRG at the beginning of the load sequence clears the SAM 631. The characters to be printed are loaded into the SAM 631 from right to left, i.e., the first character loaded will be the rightmost character in the printed output, and the last character loaded will be the leftmost character in the printed output. Each "character" is loaded by sending its proper seven bit code over EXT, six of which bits are loaded into SAM 631 upon a subsequent character print (CP) command received over IRG, and decoded in decoder 648 for activating control logic 649 accordingly. If a blank in the printed output is desired, a step print (SP) command is transmitted over IRG for actuating logic 649 effecting a six bit code to be entered into the SAM representing a blank.

If a function command is transmitted over EXT, its seven bit code is communicated to PLA 630. A function print command (FP) transmitted on IRG actuates logic 649 to enable a seven bit code representing the function to be decoded by PLA 630 which generates in response thereto three six bit codes representing a three character function grouping to be loaded into SAM 631. When all 20 characters plus blanks desired in the output have been loaded into SAM 631, a print command (PP) over IRG via logic 649 actuates timing generator 634 to begin sequencing. Generator 634 strobes the first row of each selected ROM grouping corresponding to each of a group of the twenty character printer, while the SAM 631 powers up in sequence each selected character code partitioned in ROM 632. Sixty-four codes are partitioned in ROM 632, and SAM 631 powers up only the grouping in the ROM corresponding to the character desired to be printed at that particular strobed time. That is, 26 bit words address in sequence twenty blocks of ROM 632 for burning the first dot of each "A" group. Then the second dot of each "A" group is enabled due to decode 639 and after twenty additional addresses from the SAM 631, with each address being communicated during one S time, the second dot of each dot group is printed, etc. After a total of 5 × 20 S times, the first row of dots is completed for all 20 characters. The decoder 644 addresses the rows of the ROM representing the second row of each character. After a total of 5 × 20 × 7 or 700 addresses from the SAM 631, a complete character line is printed.

Time generator 634 counts instruction cycles and waits between activations of the one-out-of-seven decoder 644 until sufficient time has elapsed, i.e., 5 milliseconds, to complete the burn. For effecting display of VLED matrices the five millisecond delay is unnecessary and generator 634 operates at the faster rate of preferably 90 KHz.

Modification to the above circuit is explained in "Strobed Alphanumeric Display System," Ser. No. 439,474, referenced above, so that the outputs from registers 638 on lines 622 actuate a segmented display such as a bank of VLED's arranged in a similar sequence of 5 × 7 "dots." The addressing of the VLED array via lines 622 and the one-out-of-five decode. 639 is as above described. However, the output from the one-out-of-seven decodes 644 on lines 619*a* is coupled to a counter 650 as shown in FIG. 11*a* via lines 619*b*. As will be explained, seven bit counter 650 circulates a single bit through the seven row positions for actuating each row of the seven row matrix in sequence, in a manner analogous to vertial displacement of the paper by the paper drive motor 619.

Referring now to FIG. 11*a*, there is shown a functional representation of the VLED display matrix and counter 650 utilized in combination with the driver chip 23 for displaying the alphanumeric prompting commands according to an embodiment of this invention. Twenty groups of 5 × 7 diode arrays are arranged having the respectively positioned diode in each row electrically connected in common. That is, line A1 connects the first dot in the first row of each array, line A2 connects the second dot in each 5 × 7 groups, etc. Lines B1–B7 electrically couple each row of each diode matrix with the like row of the grouping, i.e., line B1 connects the first row of each matrix while B2 connects the second row, etc. It is understood that lines B1–B7 need not originate from counter 650 as shown, but may be shown serially connecting the diode rows.

Counter 650 is a 7 bit counter wherein a logic zero is shifted one bit at a time so as to effect strobing of the seven rows of the diode matrices. All B1 lines are actuated for one D time, for example, while all B2 lines are actuated during the succeeding D time, etc. Line 619*b* from the printer chip is understood to be the analogous connection to the printer/display chip 618 in FIG. 10, as lines 619*a* couple to the paper drive motor 619. In the above described manner, it is seen that functioning of the VLED display is analogous to that earlier described with respect to the printer output. Appropriate diodes are actuated in each row, and then the next succeeding row is actuated until the entire seven rows are scanned, with the scanning rate at a sufficiently high rate such that the eye sees a continuous scan to effect a complete alphanumeric character. That is, referring to FIG. 11*b*, it is seen that the I0-I15 digits have a 11110 code for the A1 dot. This means that to generate the word "ENTER" as shown in FIG. 11*a*, then the two tables shown in FIG. 11*b* will be utilized to energize the first two rows of diodes in the matrixes.

Fabrication of light emitting diode displays is now well known in the art and interconnection thereof in the manner above described is readily accomplished. Counter 650 is a conventional seven stage shift register.

The counter 650 in combination with the register 638 in FIG. 10 for driving the diode matrix display is such that a moving message may be generated on the diode display. That is, by shifting the contents in the SAM 631 and accordingly in the output register 638 in FIG. 10 one bit at a time at the appropriate rate and shifting in a new data bit to be displayed and energizing the appropriate diodes accordingly, then a moving or flowing display is generated. This, of course, advantageously allows more than a twenty digit prompting command to be displayed on the display. A typical frequency for actuating the diode matrices and shifting the register 638 is 30 Hertz.

Referring now to FIG. 12*a*, there is shown the timing relationship between the clocks $\phi_1$ and $\phi_2$ provided by the clock chip 21 and between the internally generated clocks $P_1$ and $P_2$.

The frequency used is 250 KHz for $\phi_1$, $\phi_2$ at the fast rate and 40 KHz at the slow rate. The clock generators may be conventional and are not shown herein.

One set of clocks $\phi_1 P_1 \phi_2 P_2$ is referred to as a state time, and represents the time for one bit from each of the main registers A, B, C and D to be operated on in parallel by the ALU, etc. The BCD arithmetic used in the arithmetic chip requires one full set of clock pulses for each digit, so sixteen sets or state times are needed to perform arithmetic operations on all sixteen digits in a register. Sixteen state times represent one D time or instruction cycle, as seen in FIG. 12*b*.

Individual address lines in the SAM registers are energized only for three of the clocks $\phi_1$, $P_1$, $\phi_2$, rather than all four; these groups of three are also referred to as state times $S_0$–$S_{15}$ as seen in FIG. 12*a*. The same state times generated to operate the address lines of the SAM register also operate or time the remainder of the system.

D times generated directly from state times $S_0$–$S_{15}$ are used to scan the keyboard. As seen in FIG. 9*b*, the D times count down, D15, D,14, D13 . . . D0 while the state times count up, S0, S1, S2 . . . S15. This feature aids in the zero suppression technique since leading zeros to be suppressed are on the lft or MSD first while the ALU must operate from right to left or LSD first.

In FIG. 13, there is seen a sixteen by seven matrix showing the keys from the keyboard arranged as scanned by the sixteen digit timing signals $D_0$–$D_{15}$, and as sensed on the seven outputs at KN-KT, from which keyboard information is entered into the system. If a "1" voltage appears on line KP at $D_{13}$ time, then the EE key is depressed, etc. The combination of a digit time and a sense line identifies a key, and these sixteen and seven line items are binary encoded within the machine to appear as 4 and 3 bits, respectively. The keyboard and digit time information is loaded into the keybaord register 54 for subsequent addressing for the ROM execution by the ALU, or transmission (on the EXT line) to the programmer chip 400 or card reader/writer chip 500. The various unlabeled blocks at crosspoints in the matrix are understood to be locations presenting such functions on the keyboard 2 in FIG. 1 as Paper Advance (PA), YES, NO, GOTO, ALF, LRN, etc.

Shown in FIGS. 14a-14f is one chosen format for representing the instruction word $I_0-I_{12}$ and its decoded meaning. FIG. 11a denotes the thirteen bit instruction word $I_0-I_{12}$ as it appears in the instruction register 26 on the SCOM chip after it has been read out of the ROM 20. The formats for operations on branches (or increments) are different as seen in FIGS. 14a and 14b. The $I_{12}$ bit is shown containing a "1" indicating that the instruction word is either an increment or a conditional branch command and not an instrution. That is, if bit $I_{11}$, the COND bit, matches the COND bit of external communicated from the arithmetic chip at time $S_1$, then bits $I_1-I_{10}$ of FIG. 14a represent a relative branch address. That is, bits $I_1-I_{10}$ represents an incremental number which is to be added or subtracted from the previous ROM location as commanded by the $I_0$ bit in FIG. 14a to generate a new address as shown in FIG. 14a. If the $I_0$ bit is a zero, then the relative branch address in bits $I_1-I_{10}$ is to be added to the old address. If $I_0$ is a "1", then the relative branch address is to be subtracted from the old address.

If the $I_{12}$ bit of the instruction word in the instruction register 26 is a zero, then bits $I_0-I_{11}$ represent an instruction which is decoded locally on the arithmetic chip and in the decode PLA 28 on the SCOM chip. For example, bits $I_8-I_{12}$ are decoded in the digit mask PLA 83 to provide the M or masking operations defined for an M field of $M_0-M_{15}$ and to provide a constant N. Bits $I_4-I_7$ are decoded by the R decode PLA 73 to provide the register or R operation indicated. Bits $I_4-I_7$ are also decoded in the D/S flag test and mask comparator 68 for providing FMSK as shown in FIG. 14c. Bits $I_0-I_2$ are decoded in the sigma decoder 74 for controlling register select while the $I_3$ bit actuates the logic and encoder 77 for indicating add or subtract. In FIG. 14c, the $I_0-I_3$ bits are decoded by the flag decode pLA 72 for generating the F or flag commands for controlling the flag registers. Decode PLA 28 decodes the instruction word for providing store and recall of the F and G registers.

Figure 14G:
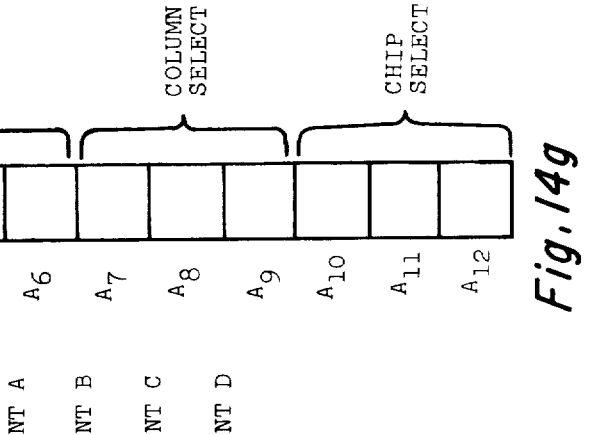

Bits $I_0-I_7$ also actuate the K comparator 78 for determining which K line of the keyboard has been actuated upon a key depression. In FIG. 14e, bits $I_0-I_3$, which are decoded in the flag decode PLA 72, also generate the wait or W instructions for placing the calculator in a nonoperational or waiting condition until a specified condition such as the arrival of a specific D time encoded in bits $I_4-I_7$. Bits $I_4-I_7$ are decoded in the flag mask comparator 68 for generating the condition whose occurrence controls wait.

Figure 14F:
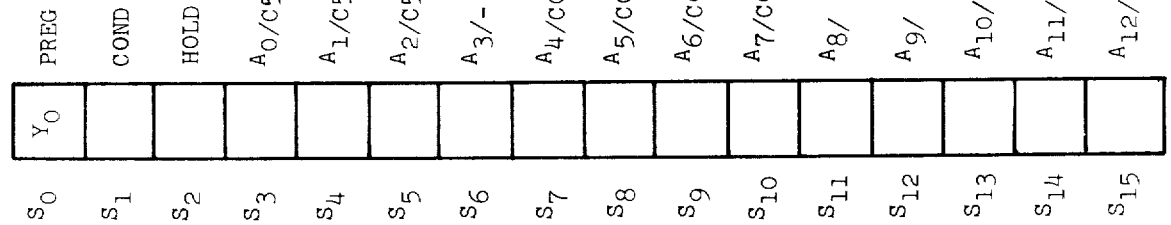
Figure 14E:
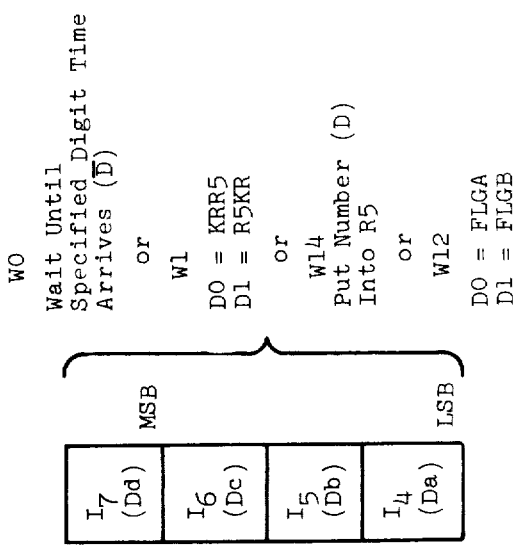

In FIG. 14f, the external command EXT is generated from the data chip in performing a "P Reg" or constant ROM recall or addressing of the printer/display chips. In bits $S_0$, the "P Reg" command with a "1" therein represents the condition that the arithmetic chip is desiring to jam in a specific address into the ROM for causing an unconditional jump, such as at power up clear. A zero in bit $S_0$ represents the conditions that the arithmetic chip may be either addressing the constant ROM, executing a conditional branch or merely communicating COND and HOLD signals. The P Reg jam-in-circuitry is inactivated during constant recall allowing the ROM to increment normally. The second bit, occuring at time $S_1$, is the COND bit for communicating to the SCOM chip the status of the condition latch, indicating that a conditional event has occurred to which the ROM should respond. The COND bit at time $S_1$ controls whether or not a conditional branch is executed as determined by the most recent instruction word from the ROM. That is, if the $S_1$ bit of external matches bit $I_{11}$ of the branch instruction, then the ROM will be incremented by the relative branch address as earlier discussed.

The third bit of external, occurring at time $S_2$, is the HOLD command indicating that the SCOM is to inhibit the incrementing of the ROM and "HOLD" the ROM instruction word for a specified period. The HOLD bit is responsive, for example, to the "WAIT" generator 69.

Bits $S_3-S_{15}$ are always specific absolute addresses. If the $S_0$ bit is a "1" then the $S_3-S_{15}$ bits represent a specific address in the ROM to which it is to branch. If the $S_0$ bit is a zero, then the $S_3-S_{15}$ address may be that of a constant location in the constant ROM 35 for doing a "recall constant" or a conditional branch to the specific main ROM location. Upon a "recall constant instruction," as decoded from the decode PLA 28, then the preceding EXT communication with a zero at time $S_0$ will recall the specific constant. Bits $S_3-S_9$ are also utilized in addressing the printer/display chips 22, 23. That is, upon a proper instruction word such as "Print" or "Display" (not shown in FIG. 11) by way of the IRG line, then the display/printer chip knows that the subsequent data in the $S_3-S_9$ bits on EXT is a decoded character or function representation which is to be printed/displayed. Six bits are required to send a character print/display while seven are utilized to send a function print. These codes are, of course, correlated with the characters stored in the ROM 632 and any suitable format may be chosen.

Depicted in FIG. 14g is the coding format for the ROM address word as stored in the address register 23 on the SCOM chip. As the 1024 13-bit instruction words are stored in the ROM 20 in a 64 × 16 × 13 bit array, bits $A_0-A_6$ address the eight columns per row for selecting the proper column addressed. Bits $A_{10}-A_{12}$ represent chip select and are decoded so as to enable buffer 27 so as to control whether or not the instruction word from the ROM 20 is communicated to the arithmetic chip.

It is understood that it is well within the capability of one having oridinary skill in the art to program a ROM code to implement the operation of the embodiment herein described. An exemplary ROM code programming the arithmetic and SCOM chips into a scientific calculator and the instruction word encoding thereof is found in the above-referenced copending patent application Ser. No. 397,060, with FIGS. 14a-14f reproducing therefrom the decode of the instruction word and decode of EXT.

Initially the pwower on the calculator is turned on, and the calculator executes a power up clear routine wherein the ROM 40 in the SCOM chip is forced to its location zero. Normally, specific keyboard inputs which are encoded as K line and D time information are loaded into the keyboard register 54 and an "PREG" command forces the ROM on the SCOM chip to the location determined by the contents of the keyboard register. However, during power up clear, a hardware technique is utilized to force the ROM to location zero.

The above-mentioned keyboard register provides functions other than addressing the main ROM and the constant ROM in the SCOM chip. The keyboard register utilizes an instruction word which causes the contents of the keyboard register to be incremented by one, allowing it to function as a counter. If the number in the keyboard register represents an address of a constant in the constant ROM on the SCOM chip or of a character in chips 22, 23, then a succession of constants or characters may be provided during successive instruction cycles so that a subroutine may perform several iterations utilizing progressively smaller constants according to an arithmetic progression. That is, since the keyboard register recirculates and has an add-one circuit, information therein may also be incremented by one, thereby providing a method for addressing characters in sequence in ROM 632 by doing a succession of appropriate instructions with the keyboard register incremented by one each time.

Keyboard register 54 provides the means for transmission of program steps to program storage (programmer chip 400 and program storage shift registers 450). The contents of keyboard register 54, representing a particular programming key operation, may be serially applied on the EXT line to the programmer chip 400, where the data is stored in a sequence as a number of program steps, which may be recalled later. When recalled by the calculator system, the program step words re-enter the keyboard register 54 and are used to address the main and constant ROM's as if they had just been manually entered from the keyboard matrix. Besides transmitting and receiving program step words to and from the programmer chip 400, the keyboard register 54 is the origin of program step words transmitted on the EXT line to card reader/writer chip 500. From this chip, the program step words are applied to the magnetic heads of the writing mechanism so as to store a sequence of such program step words on a magnetic card. When reading a magnetic card, program step words are received by the keyboard register 54 from card reader/writer chip 500 (via the EXT line). During the reading process, once the program step words are received by keyboard register 54, they may be used to address the main and constant ROM's of the calculator as though they were manually entered in keyboard register 54 from the keyboard matrix or may be transmitted to programmer chip 400 for storage. It is not necessary, however, in the case of program step words received from program storage or from the card reader to use a keyboard scanning and checking routine to determine if a key has been depressed for a sufficient length of time as is normally performed for keyboard entry.

As previously discussed, in an alternate embodiment illustrated in FIG. 15, the programmer chip 400 which controls the storage of the program steps in the shift register memory chips 450 (See FIG. 2a) is eliminated by providing the program storage and retrieval functions in software. The software is stored in additional ROM chips 725 and 726, for example, which control arithmetic chip 15 to provide the desired program storage and retrieval operations. Then, instead of storing the program steps in shift register memories, they are stored in random access memory chips 727-728, two of which are shown. Four such random access memory chips provide, for example, storage of up to 480 program steps while additional chips may be employed to expand the number of steps which may be stored to 960 or 1920, for example.

It is thus seen that a user programmable calculator is provided which, in response to a series of alphanumeric message entries which may be stored along with user program steps in memory when the calculator is in a program storage mode, generates a visual indication or prompting message when the calculator is in the execution mode in order to indicate to the user the next input expected by the calculator system. The alphanumeric messages may be entered by means of keyboard entries and are transferrable to and from a magnetic storage media. Further, a special set of response keys is provided on the keyboard to enable further execution of the program in a user selected manner whenever a prompting message is displayed during user program execution. Option may be provided for a display and/or a printed output and, further, the display may be strobed so as to effect continuously moving characters thereby increasing the capacity of the display. In one calculator embodying the invention, a special programmer chip and user program storage memory are utilized while, in an alternate embodiment, the function of the hard-wired logic of the programmer chip may be transferred to a software program stored in one or more additional ROM chips which in turn selectively control the arithmetic chip to perform the required functions and a single central memory implemented in RAMs provided for storage of user program steps as well as data and/or system operating parameters, the central memory being under the control of the arithmetic chip as controlled by the program stored in the additional ROM chips.

Various calculator systems embodying the present invention have now been described in detail. Since it is obvious that many additional changes and modifications can be made in the above-described details without departing from the nature and spirit of the invention, it is understood that the invention is not to be limited to said details except as set forth in the appended claims.

What is claimed is:

1. A programmable calculator having program storage and program execution modes comprising:
   a. a keyboard having function keys and alphanumeric data entry means and a plurality of response keys;
   b. storage means for storing data and user program instructions including prompting messages which indicate specific information required by a user program in order to proceed executing a user program with said calculator in said program execution mode;
   c. means selectively coupling said keyboard to said storage means for transferring data and user program instructions including prompting messages in a selected sequence from the function keys and alphanumeric data entry means to said storage means with said calculator in said program storage mode;
   d. control means for controlling the operation of said calculator in response to the user program instructions stored in said storage means;
   e. an arithmetic means for performing arithmetic operations on data stored in said storage means in response to the user program instructions under control of said control means;

f. output display means for displaying data stored in said storage means and for displaying said prompting messages; and g. means selectively coupling said response keys to said control means for controlling said calculator to selectively proceed in the execution of the user program in one of a plurality of different preselected manners whenever said response keys are actuated in response to the display of said prompting messages.

2. The programmable calculator according to claim 1 wherein said storage means includes a plurality of shift register memory means.

3. The programmable calculator according to claim 1 wherein said storage means includes a plurality of random access memory means.

4. The programmable calculator according to claim 1 wherein said storage means includes means for storing said user program instructions on a recording medium.

5. The programmable calculator according to claim 4 wherein said storage medium is a magnetic card.

6. The programmable calculator according to claim 1 wherein said response keys include a "yes" indicating key and a "no" indicating key for indicating to said control means whether or not to proceed in the manner suggested by a prompting message displayed by said output display means.

7. The programmable calculator according to claim 1 wherein said response keys include a "NOT APPLICABLE" indicating key for indicating to said control means to proceed in execution without a further response to a prompting message display by said output display means.

8. The programmable calculator according to claim 1 wherein said response keys include an "ENTER" indicating key for entering further data from said function keys and alphanumeric data entry means in response to a prompting message displayed by said output display means.

9. The programmable calculator according to claim 1 including logic means coupled to said output display means for decoding said prompting messages displayed by said output display means.

10. The programmable calculator according to claim 1 wherein said display means includes a plurality of light emitting diode display elements having energizable light emitters arranged in a preselected pattern for displaying alpha and numeric characters.

11. The programmable calculator according to claim 1 wherein said display means includes a printing device for printing alpha and numeric characters on a printing medium.

* * * * *